US008184870B2

(12) United States Patent
Li

(10) Patent No.: US 8,184,870 B2
(45) Date of Patent: May 22, 2012

(54) APPARATUS, METHOD, AND PROGRAM FOR DISCRIMINATING SUBJECTS

(75) Inventor: Yuanzhong Li, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/029,868

(22) Filed: Feb. 17, 2011

(65) Prior Publication Data

US 2011/0142355 A1  Jun. 16, 2011

Related U.S. Application Data

(62) Division of application No. 10/935,336, filed on Sep. 8, 2004, now Pat. No. 7,920,725.

(30) Foreign Application Priority Data

| Sep. 9, 2003 | (JP) | 2003-316924 |
| Sep. 9, 2003 | (JP) | 2003-316925 |
| Sep. 9, 2003 | (JP) | 2003-316926 |
| Sep. 1, 2004 | (JP) | 2004-254430 |
| Sep. 1, 2004 | (JP) | 2004-254431 |
| Sep. 1, 2004 | (JP) | 2004-254432 |

(51) Int. Cl.
*G06K 9/00* (2006.01)
(52) U.S. Cl. ........................ 382/118; 382/224
(58) Field of Classification Search .................. 382/118, 382/173
See application file for complete search history.

(56) References Cited

U.S. PATENT DOCUMENTS

| 5,163,094 A | * | 11/1992 | Prokoski et al. | 382/118 |
| 5,410,609 A | * | 4/1995 | Kado et al. | 382/118 |
| 5,604,820 A | * | 2/1997 | Ono | 382/190 |
| 5,680,481 A | * | 10/1997 | Prasad et al. | 382/190 |
| 5,689,575 A |   | 11/1997 | Sako et al. |  |
| 5,715,325 A |   | 2/1998 | Bang et al. |  |
| 5,832,183 A | * | 11/1998 | Shinohara et al. | 706/20 |
| 5,905,807 A | * | 5/1999 | Kado et al. | 382/118 |
| 6,181,805 B1 |   | 1/2001 | Koike et al. |  |
| 6,681,032 B2 |   | 1/2004 | Bortolussi et al. |  |

(Continued)

FOREIGN PATENT DOCUMENTS

JP 07-200774 A 8/1995

(Continued)

OTHER PUBLICATIONS

Japanese Office Action, dated Mar. 30, 2010.

(Continued)

*Primary Examiner* — Jason M Repko
*Assistant Examiner* — Gandhi Thirugnanam
(74) *Attorney, Agent, or Firm* — Sughrue Mion, PLLC

(57) ABSTRACT

A characteristic amount calculating means calculates first characteristic amounts, which do not require normalization, and normalized second characteristic amounts. A first discriminating portion discriminates whether a candidate for a face is included in the target image, by referring to first reference data with the first characteristic amounts, calculated from the target image. The first reference data is obtained by learning the first characteristic amounts of a plurality of images, which are known either to be of faces or to not be of faces. In the case that the candidate is included, a second discriminating portion discriminates whether the candidate is a face, by referring to second reference data, obtained by learning the second characteristic amounts of a plurality of images, which known either to be of faces or to not be of faces.

20 Claims, 14 Drawing Sheets

U.S. PATENT DOCUMENTS

| | | | |
|---|---|---|---|
| 6,690,814 B1* | 2/2004 | Yuasa et al. | 382/118 |
| 6,714,688 B1* | 3/2004 | Gallagher et al. | 382/266 |
| 6,816,611 B1* | 11/2004 | Hagiwara et al. | 382/165 |
| 6,885,760 B2 | 4/2005 | Yamada et al. | |
| 6,940,545 B1* | 9/2005 | Ray et al. | 348/222.1 |
| 7,072,526 B2 | 7/2006 | Sakuramoto | |
| 7,130,453 B2 | 10/2006 | Kondo et al. | |
| 7,130,469 B2* | 10/2006 | Adachi | 382/224 |
| 7,203,346 B2* | 4/2007 | Kim et al. | 382/118 |
| 7,227,996 B2 | 6/2007 | Imagawa et al. | |
| 7,433,498 B2* | 10/2008 | Sanse et al. | 382/115 |
| 7,440,638 B2* | 10/2008 | Nagahashi et al. | 382/305 |
| 7,715,597 B2 | 5/2010 | Costache et al. | |
| 7,813,526 B1 | 10/2010 | Bourdev | |
| 7,920,725 B2* | 4/2011 | Li | 382/118 |
| 2001/0019620 A1 | 9/2001 | Nagai et al. | 382/104 |
| 2001/0036298 A1* | 11/2001 | Yamada et al. | 382/118 |
| 2001/0052928 A1 | 12/2001 | Imagawa et al. | |
| 2002/0081032 A1* | 6/2002 | Chen et al. | 382/199 |
| 2003/0026456 A1 | 2/2003 | Akutagawa | |
| 2003/0026485 A1* | 2/2003 | Gotsman et al. | 382/224 |
| 2003/0198368 A1* | 10/2003 | Kee | 382/118 |
| 2004/0008890 A1* | 1/2004 | Clark et al. | 382/197 |
| 2004/0071346 A1* | 4/2004 | Clark et al. | 382/209 |
| 2004/0136574 A1* | 7/2004 | Kozakaya et al. | 382/118 |
| 2004/0136754 A1* | 7/2004 | Yamamoto et al. | 399/223 |
| 2004/0151381 A1* | 8/2004 | Porter et al. | 382/218 |
| 2005/0100195 A1* | 5/2005 | Li | 382/118 |
| 2005/0105827 A1* | 5/2005 | Yonaha et al. | 382/291 |
| 2005/0190963 A1* | 9/2005 | Li | 382/159 |
| 2006/0104487 A1* | 5/2006 | Porter et al. | 382/118 |
| 2006/0115157 A1* | 6/2006 | Mori et al. | 382/190 |
| 2009/0010544 A1* | 1/2009 | Li et al. | 382/190 |
| 2009/0141948 A1* | 6/2009 | Nakaoka et al. | 382/118 |
| 2010/0054589 A1* | 3/2010 | Ishii | 382/167 |

FOREIGN PATENT DOCUMENTS

| | | |
|---|---|---|
| JP | 7-302327 A | 11/1995 |
| JP | 8-063597 A | 3/1996 |
| JP | 11-306348 A | 11/1999 |
| JP | 2000-242782 A | 9/2000 |
| JP | 2000-331190 A | 11/2000 |
| JP | 2001-051338 A | 2/2001 |
| JP | 2001-216515 A | 8/2001 |
| JP | 2001-330882 A | 11/2001 |
| JP | 2002-051316 A | 2/2002 |
| JP | 2002-056394 A | 2/2002 |
| JP | 2002-133423 A | 5/2002 |
| JP | 2002-304627 A | 10/2002 |
| JP | 2003-036439 A | 2/2003 |
| JP | 2003-099777 A | 4/2003 |

OTHER PUBLICATIONS

Ming-hsuan Yang and David J. Kriegman and Senior Member and Narendra Ahuja, "Detecting faces in images: A survey," IEEE Transactions on Pattern Analysis and Machine Intelligence, 2002, vol. 24, p. 34-58.

Rowley, Henry et al, "Neural Network-Based Face Detection" Computer Vision and Pattern Recognition, 1996.

Lienhart, Rainer et al, "An Extended Set of Haar-like Features for Rapid Object Detection" International Conference on Image Processing.

Kazuo, M. et al, "Detection of Malignant Tumors in DR Images—Iris Filter", Journal of the Electronic Information Communications Association, D-II vol. J75-D-II No. 3, Mar. 1992, pp. 663-670.

Kapoor, Ashish et al, "Real-Time, Fully Automatic Upper Facial Feature Tracking" The 5th International Conference on Automatic Face and Gesture Recognition, May 2002.

Yilmaz, Alper et al, "Automatic Feature Detection and Pose Recovery for Faces" The 5th Asian Conference on Computer Vision, Jan. 2002.

Tian, Ying-Li et al, "Dual-State Parametric Eye Tracking" The 4th IEEE International Conference on Automatic Face and Gesture Recognition, 2000.

* cited by examiner

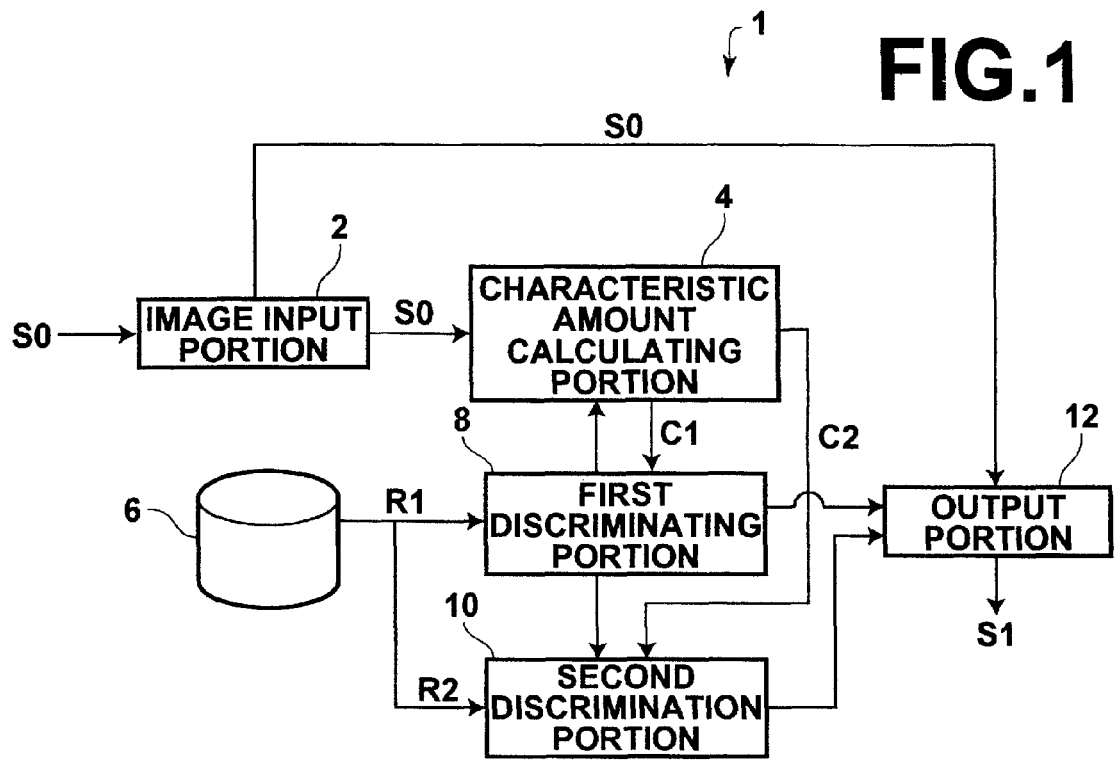
FIG.1
FIG.2A
FIG.2B
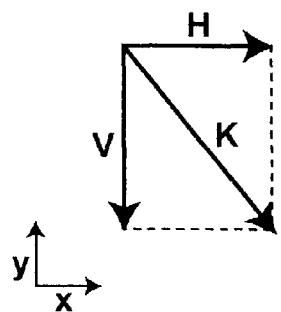
FIG.3

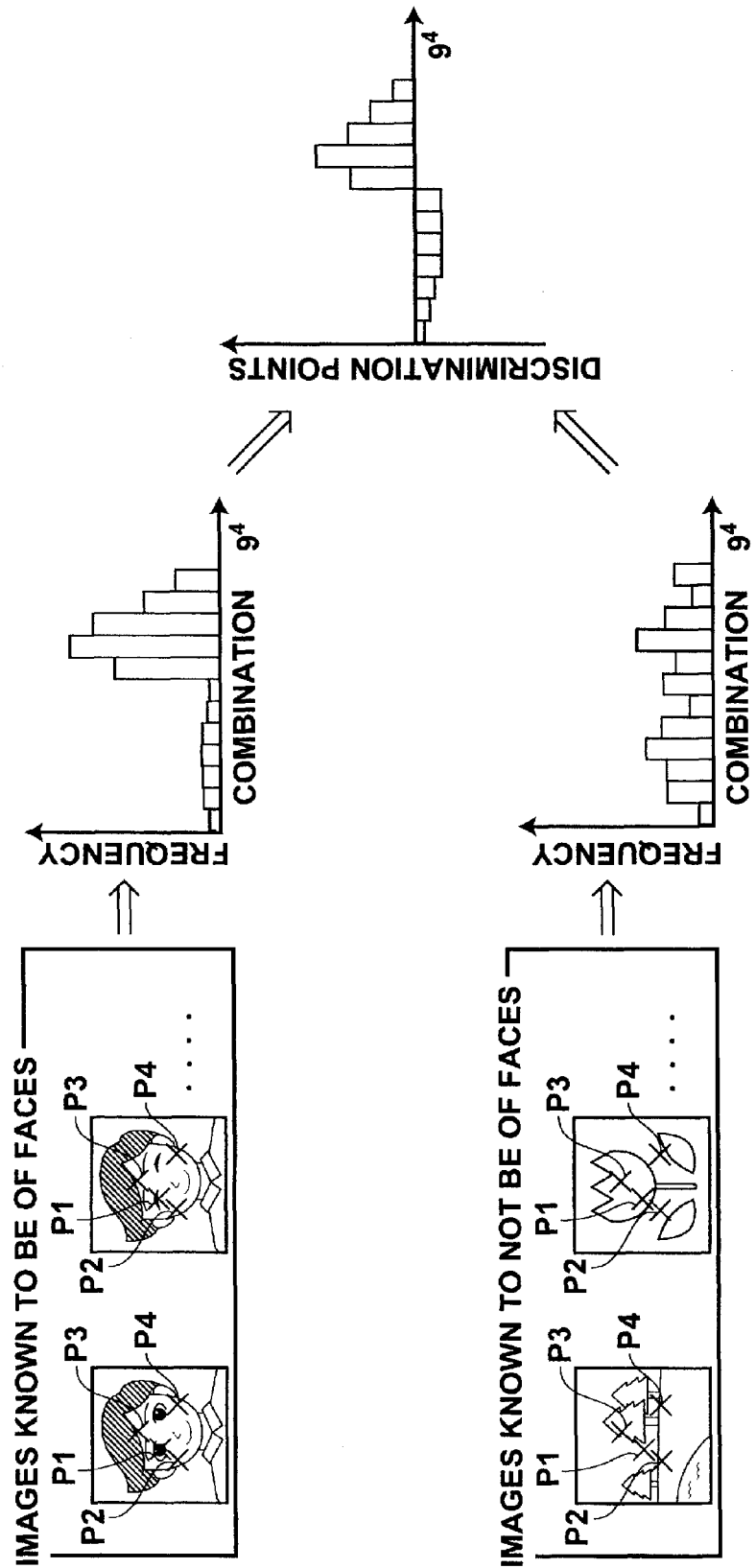

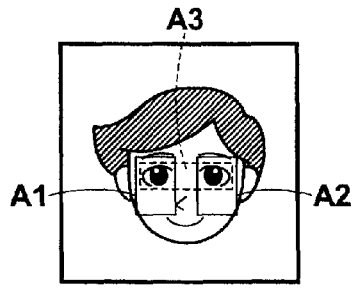
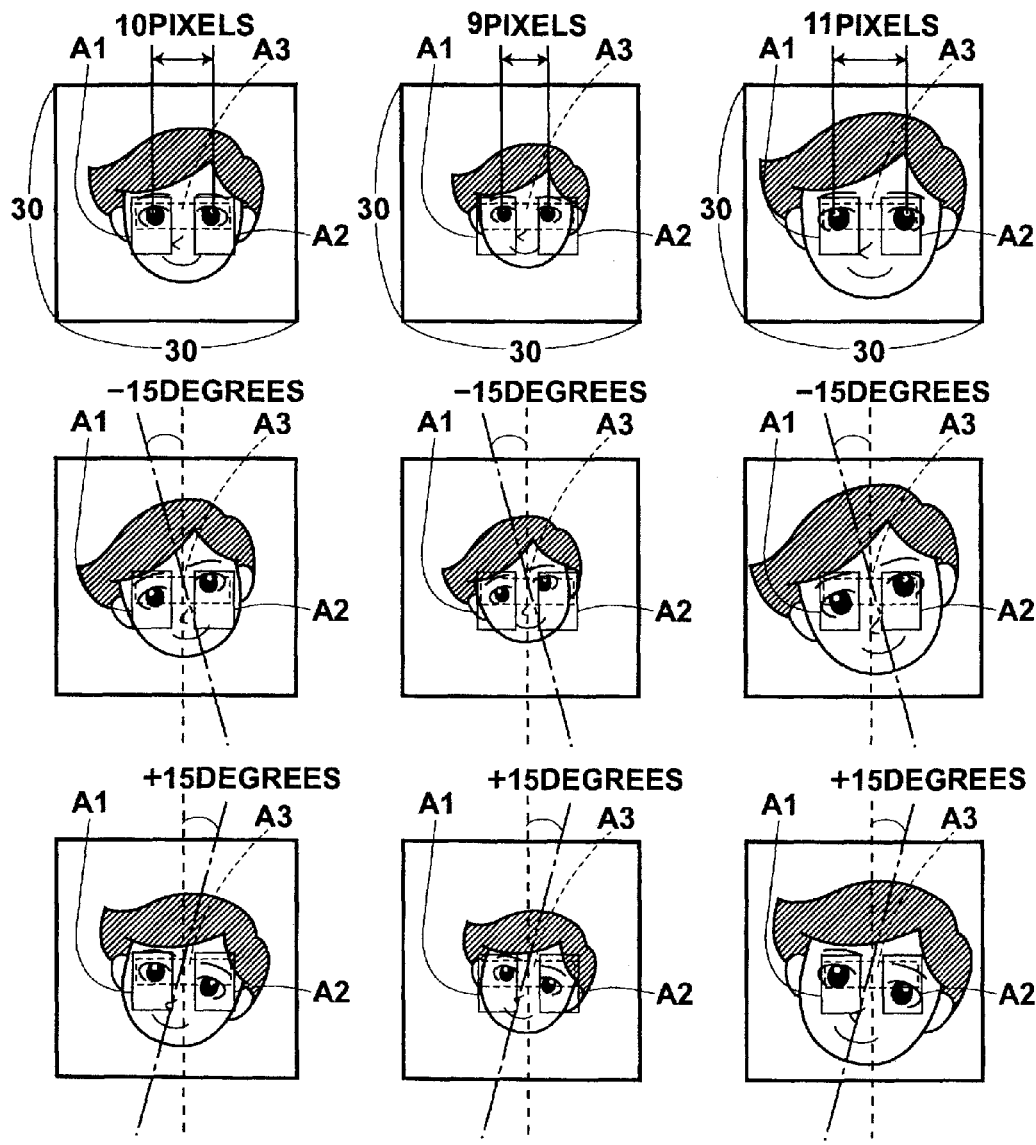

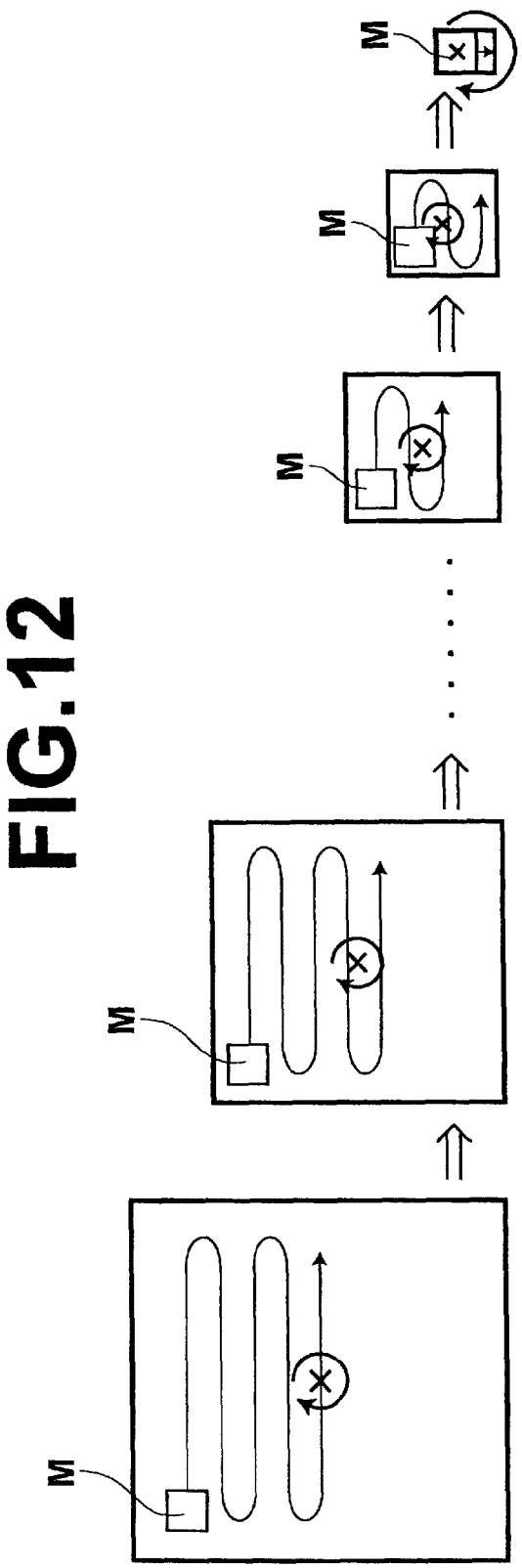

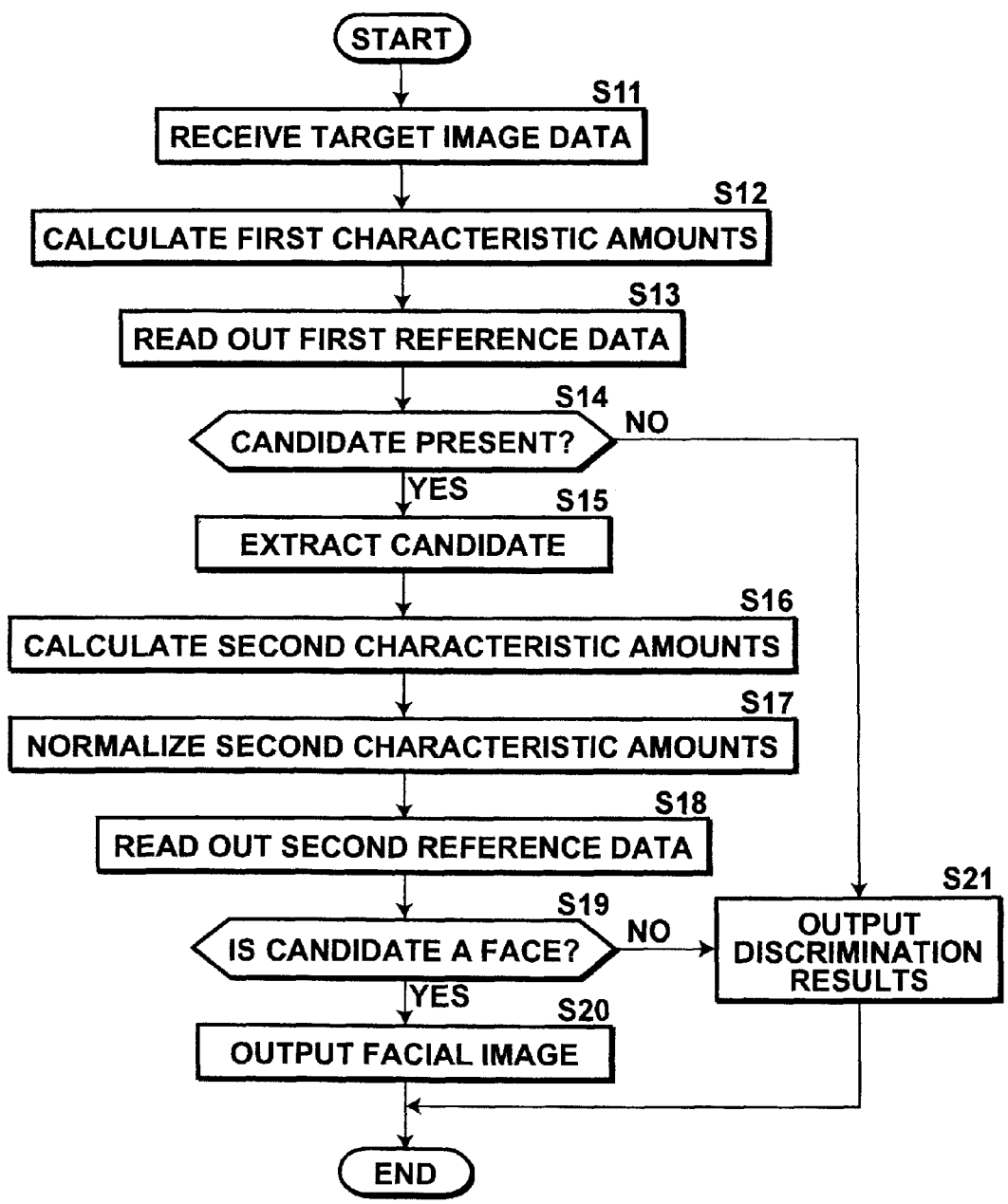

APPARATUS, METHOD, AND PROGRAM FOR DISCRIMINATING SUBJECTS

CROSS-REFERENCE TO RELATED PATENT APPLICATIONS

This is a Divisional of Application No. 10/935,336 filed Sep. 8, 2004, which claims priority from Japanese Patent Application Nos. JP 254430/2004, JP 254431/2004, and JP 254432/2004, all filed Sep. 1, 2004, and Japanese Patent Application Nos. JP 316924/2003, JP 316926/2003, and JP 316925/2003, all filed Sep. 9, 2003, the contents of all of which are incorporated herein by reference in their entireties.

BACKGROUND OF THE INVENTION

1. Field of the Invention

The present invention relates to a subject discriminating apparatus and a subject discriminating method for discriminating whether a predetermined subject, such as a face, is included in an image. The present invention also relates to a program that causes a computer to execute the subject discriminating method.

2. Description of the Related Art

Image data obtained by digital cameras and image data obtained by reading out images recorded on film are reproduced as hard copies, such as prints, or as soft copies, on displays. It is often the case that images represented by the image data include faces of people. Therefore, image processes that correct brightness gradation, color, sharpness, and the like, are administered on the image data so that the faces are of appropriate brightness and color. In the case that image processes are administered on image data in this manner, it is necessary to extract face regions that correspond to people's faces from the images represented by the image data. Accordingly, various methods have been proposed, for judging whether a predetermined subject, such as a face, is included in an image. In addition, various methods have also been proposed, for detecting the positions of structural components of a face, such as eyes. The detection of structural components enables accurate trimming of faces which have been judged to be included in images.

Henry A. Rowley, Shumeet Baluja, and Takeo Kanada, "Neural Network-Based Face Detection", Computer Vision and Pattern Recognition, 1996 (hereinafter referred to as Document 1) discloses a method for discriminating whether an image includes a face. In this method, brightness values, which are characteristic amounts employed in detecting faces, are normalized. Then, whether a face is included in an image is judged by referring to learning results of a neural network, which has performed learning regarding faces, with the normalized brightness values. Note that in the method disclosed in Document 1, samples used for learning by the neural network are given an allowable range, to facilitate detection of faces within images. Specifically, a plurality of samples are prepared, in which the sizes of faces are varied, faces are rotated, and the like. Rainer Lienhart and Jochen Maydt, "An Extended Set of Haar-like Features for Rapid Object Detection", International Conference on Image Processing (hereinafter referred to as Document 2) discloses another method of discriminating whether an image includes a face. In this method, high frequency components included in an image, which represent edges and the like, are obtained and normalized as characteristic amounts which are employed to detect a subject. Then, whether a face is included in an image is judged by referring to results of learning regarding characteristic amounts employing a machine learning method called "boosting" with the normalized high frequency components. The methods disclosed in Documents 1 and 2 are capable of accurately discriminating whether an image includes a subject, because the characteristic amounts employed in the detection of the subject, such as a face, are normalized.

H. Ohara et al., "Detection of Malignant Tumors in DR Images-Iris Filter", Journal of the Electronic Information Communications Association, D-II Vol. J75-D-II No. 3, pp 663-670, March 1992 (hereinafter referred to as Document 3) discloses a method of extracting candidates of tumor patterns. In this method, tumor patterns, which are a characteristic of breast cancer, are detected based on the facts that tumor patterns have slightly lower density values than their surroundings on an X-ray negative film, and that gradient vectors of arbitrary pixels within tumor patterns point toward the center of the tumor patterns. Specifically, distributions of directions of gradient vectors within an image are evaluated, and regions, in which the gradient vectors are concentrated at a specific point, are judged to be tumor patterns and extracted. Further, U.S. Pat. No. 5,604,820 discloses a method of judging whether a candidate of a subject is the subject. This method employs Kohonen's self organization, which is a neural network technique, to learn characteristic patterns of subjects, such as faces. The results of learning are referred to with characteristic portions of the candidate of the subject, and judgment is made regarding whether the characteristic portions of the candidate of the subject are included in the learned characteristic patterns. Further, judgment is made regarding whether positional relationships of characteristic portions within the candidate of the subject match those of characteristic portions within the subject, thereby judging whether the candidate is the subject.

Ashish Kapoor and Rosalind W. Picard, "Real-Time, Fully Automatic Upper Facial Feature Tracking", The 5$^{th}$ International Conference on Automatic Face and Gesture Recognition, May 2002 (hereinafter referred to as Document 4) discloses a method of detecting eyes from an image. In this method, a face is illuminated with infrared light, and photographed with an infrared camera, to obtain an image in which eyes are easily detectable. Alper Yilmaz and Mubarak A. Shah, "Automatic Feature Detection and Pose Recovery for Faces", The 5$^{th}$ Asian Conference on Computer Vision, January 2002 (hereinafter referred to as Document 5) discloses a method for detecting eyes and eyebrows. In this method, color data of eyes and eyebrows, that constitute faces, are employed to detect the eyes and eyebrows within images. Ying-li Tian, T. Kanade and J. F. Cohn, "Dual-State Parametric Eye Tracking", The 4$^{th}$ IEEE International Conference on Automatic Fac and Gesture Recognition, 2000 (hereinafter referred to as Document 6) discloses a method that judges whether eyes within an image are open or closed. In this method, templates of eyes are employed to detect the positions thereof, and whether the eyes are open or closed is judged by detection of pupils.

In the methods disclosed in Documents 1 and 2, the characteristic amounts, which are utilized to detect subjects, are normalized, thereby increasing the amount of calculations. Therefore, a problem arises that the processing time required for discrimination becomes long. The method disclosed in Document 3 only evaluates the distributions of the directions of gradient vectors. Therefore, subjects having simple shapes, such as tumor patterns, are detectable. However, subjects having complex shapes, such as human faces, cannot be detected by this method. The method disclosed in U.S. Pat.

No. 5,604,820 performs judgment on a plurality of variables, and consequently, a long amount of time is required for processing.

The method disclosed in Document 4 is only capable of detecting eyes from images obtained by photography using infrared illumination and an infrared camera. Therefore, this method lacks versatility. The method disclosed in Document 5 employs color data. Therefore, this method is not applicable to cases in which skin color is different among people of different races. The methods disclosed in Documents 4 through 6 are also incapable of detecting eyes, unless the eyes are clearly pictured in an image. Therefore, eyes cannot be accurately detected in images, in which bangs cover the eyes. In addition, the method disclosed in U.S. Pat. No. 5,604,820 is incapable of accurately detecting the positions of structural components that constitute a face, such as eyes.

SUMMARY OF THE INVENTION

The present invention has been developed in view of the circumstances described above. It is a first object of the present invention to discriminate whether a predetermined subject, such as a face, is included in an image with a comparatively short processing time.

It is a second object of the present invention to accurately detect the positions of structural components, which are included in a subject, such as eyes, which are included in a face.

The first subject discriminating apparatus according to the present invention comprises:

an image input means for receiving input of a target image, which is a target of discrimination;

a first characteristic amount calculating means for calculating first characteristic amounts, which do not require normalization and are employed to discriminate a predetermined subject, from the target image;

a first discriminating means for discriminating whether a candidate of the predetermined subject is included in the target image, by referring to first reference data, in which the first characteristic amounts and discrimination conditions corresponding to the first characteristic amounts are defined in advance, with the first characteristic amounts calculated from the target image;

a second characteristic amount calculating means for calculating second characteristic amounts, which are normalized and employed to discriminate the predetermined subject, from the candidate of the predetermined subject in the case that the first discriminating means judges that the candidate is included in the target image; and a second discriminating means for discriminating whether the candidate is the predetermined subject, by referring to second reference data, in which the second characteristic amounts and discrimination conditions corresponding to the second characteristic amounts are defined in advance, with the normalized second characteristic amounts.

The "predetermined subject" refers to subjects having substantially uniform shapes, and which are capable of being resized to approximate a substantially uniform size. Specific examples of the predetermined subject are: human faces; vehicles; and road signs.

The "characteristic amounts" refer to parameters that represent characteristics of an image. The characteristic amounts may be any parameter that represents a characteristic of the image. Specific examples of the characteristic amounts are: gradient vectors that represent the density gradient of each pixel of the image; color data (hue, chroma) of each pixel; density; characteristic textures; depth data; and characteristic edges included in the image.

The "first characteristic amounts, which do not require normalization" are characteristic amounts that are not dependant on changes in brightness or contrast of an image. For example, the direction and amount of change of density with respect to each pixel in the image, that is, density gradients, are represented by gradient vectors. The magnitudes of the gradient vectors vary corresponding to the density of the pixels, and corresponding to a variance in contrast in a specific direction viewed from the pixels. However, the directions of the gradient vectors do not change, regardless of the magnitudes thereof. In addition, color data, such as hue, does not change even if the density of the image changes. Accordingly, the directions of gradient vectors and color data may be employed as the first characteristic amounts.

The "second characteristic amounts" are characteristic amounts that are dependant on changes in brightness or contrast of an image. It is not possible to distinguish whether the value of the characteristic amount is smaller or larger than that of the same type of characteristic amount included in the same image or another image. As a technique to normalize the second characteristic amounts in the case that the second characteristic amounts are calculated for each pixel, the second characteristic amounts of all of the pixels that constitute the candidate of the predetermined subject may be employed to normalize the second characteristic amounts of the pixels included in the candidate of the predetermined subject, for example. Alternatively, the second characteristic amounts of a specific region of the candidate of the predetermined subject, which includes the pixels which are the target of normalization, may be employed to normalize the second characteristic amounts of the target pixels.

The "discrimination conditions" refer to conditions that discriminate between the predetermined subject and other subjects, using the characteristic amounts as indices.

Note that in the first subject discriminating apparatus of the present invention, the first discriminating means may obtain the first reference data in advance, by learning the first characteristic amounts within a plurality of sample images, which are known to include the predetermined subject, and a plurality of sample image groups, which are known to not include the predetermined subject, with a machine learning technique such as a neural network technique and a boosting technique.

Here, in the case that the predetermined subject is a face, the first discriminating means may obtain the first reference data, by learning the first characteristic amounts within a first region that includes a left eye and left cheek, and within a second region that includes a right eye and right cheek, of the sample images which are known to include the predetermined subject, and by learning the first characteristic amounts within regions corresponding to the first and second regions, of the sample images which are known to not include the predetermined subject; and the first characteristic amount calculating means may be a means for calculating the first characteristic amounts of regions that correspond to the first and second regions within the target image.

Further, the first discriminating means may obtain the first reference data, by learning the first characteristic amounts within a third region that includes both eyes, of the sample images which are known to include the predetermined subject, and by learning the first characteristic amounts within regions corresponding to the third region, of the sample images which are known to not include the predetermined subject; and the first characteristic amount calculating means may be a means for calculating the first characteristic amounts of regions that correspond to the first, second, and third regions within the target image.

In the first subject discriminating apparatus of the present invention, the second discriminating means may obtain the second reference data in advance, by learning the second characteristic amounts within a plurality of sample images, which are known to include the predetermined subject, and a plurality of sample image groups, which are known to not include the predetermined subject, with a machine learning technique.

Here, in the case that the predetermined subject is a face, the second discriminating means may obtain the second reference data, by learning the second characteristic amounts within a first region that includes a left eye and left cheek, and within a second region that includes a right eye and right cheek, of the sample images which are known to include the predetermined subject, and by learning the second characteristic amounts within regions corresponding to the first and second regions, of the sample images which are known to not include the predetermined subject; and the second characteristic amount calculating means may be a means for calculating the second characteristic amounts of regions that correspond to the first and second regions within the target image.

Further, the second discriminating means may obtain the second reference data, by learning the second characteristic amounts within a third region that includes both eyes, of the sample images which are known to include the predetermined subject, and by learning the first characteristic amounts within regions corresponding to the third region, of the sample images which are known to not include the predetermined subject; and the second characteristic amount calculating means may be a means for calculating the second characteristic amounts of regions that correspond to the first, second, and third regions within the target image.

In the first subject discriminating apparatus of the present invention, the first characteristic amounts may be the directions of gradient vectors or color data, of each pixel of an image.

The "gradient vectors" represent the direction and the magnitude of density change of each pixel within an image.

In the first subject discriminating apparatus of the present invention, the second characteristic amounts may be the directions and magnitudes of gradient vectors of each pixel of an image.

The first subject discriminating apparatus of the present invention may further comprise:

a control means, for judging whether the discrimination result by the first discriminating means satisfies predetermined requirements, and in the case that the judgment is affirmative, controlling the first characteristic amount calculating means, the first discriminating means, the second characteristic amount calculating means, and the second discriminating means so that the candidate discriminated by the first discriminating means is judged to be the predetermined subject, without calculating the second characteristic amounts and without discrimination by the second discriminating means.

In addition, the first subject discriminating apparatus of the present invention may further comprise:

at least one other discriminating means for discriminating whether the predetermined subject, judged to be included in the target image by the second discriminating means, is truly the predetermined subject, based on other characteristic amounts, which are calculated from the candidate.

Further, the first subject discriminating apparatus of the present invention may further comprise:

an extracting means for extracting the predetermined subject from the target image.

Still further, the first subject discriminating apparatus of the present invention may further comprise:

an output means for attaching data that represents the position of the predetermined subject within the target image, and outputting the data with the target image.

The first subject discriminating method of the present invention comprises the steps of:

receiving input of a target image, which is a target of discrimination;

calculating first characteristic amounts, which do not require normalization and are employed to discriminate a predetermined subject, from the target image;

discriminating whether a candidate of the predetermined subject is included in the target image, by referring to first reference data, in which the first characteristic amounts and discrimination conditions corresponding to the first characteristic amounts are defined in advance, with the first characteristic amounts calculated from the target image;

calculating second characteristic amounts, which are normalized and employed to discriminate the predetermined subject, from the candidate of the predetermined subject in the case that the first discriminating means judges that the candidate is included in the target image; and discriminating whether the candidate is the predetermined subject, by referring to second reference data, in which the second characteristic amounts and discrimination conditions corresponding to the second characteristic amounts are defined in advance, with the normalized second characteristic amounts.

Note that the first subject discriminating method of the present invention may be provided as a program that causes a computer to execute the method.

According to the first subject discriminating apparatus and the first subject discriminating method of the present invention, the first characteristic amounts, which do not require normalization, are calculated from the target image. Then, the first reference data is referred to with the first characteristic amounts, and whether the target image includes the candidate for the predetermined subject is discriminated (first discrimination). If it is judged that the target image includes the candidate for the predetermined subject, the normalized second characteristic amounts are calculated from the candidate for the predetermined subject. Then, the second reference data is referred to with the second characteristic amounts, and whether the candidate for the predetermined subject is the predetermined subject is discriminated (second discrimination). Here, the first discrimination employs the first characteristic amounts, which do not require normalization. Therefore, even if discrimination is performed regarding whether the candidate for the predetermined subject is included on the entire target image, the amount of calculations is small. As a result, discrimination regarding whether the candidate for the predetermined subject is included in the target image can be performed comparatively quickly. Meanwhile, the second discrimination employs the normalized second characteristic amounts, which enables accurate discrimination regarding whether the predetermined subject is included in the target image, although with a greater amount of calculations. However, in the present invention, the normalized second characteristic amounts are only calculated on the portion of the target image that includes the candidate for the predetermined subject. Therefore, the amount of calculations required for normalization is decreased, and the time required for the discrimination process is short. Accordingly, the present invention is enabled to perform discrimination regarding whether the predetermined subject is included in the target image at high speed and with high accuracy.

If the first and second discriminating means learns the first and second reference data in advance with a machine learning technique, discrimination capabilities can be further improved.

In the case that the predetermined subject is a face, the first and second characteristic amounts of the first region that includes the left eye and the left cheek, the second region that includes the right eye and the right cheek, and the third region that includes both eyes, of the sample images, may be utilized during the learning process. Thereby, the time required for learning can be greatly shortened. In addition, it has been empirically confirmed by the present inventors that use of the first and second characteristic amounts included in the first, second and third regions greatly contribute to improvement in discrimination capabilities, during discrimination regarding whether the predetermined subject is included in the target image. For this reason, the discrimination capabilities can be further improved by utilizing the first and second characteristic amounts included in the first, second, and third regions during learning of the first and second reference data.

In addition, the range from within which the first and second characteristic amounts are calculated is reduced by calculating the first and second characteristic amounts from the first, second, and third regions of the target image. Therefore, the time required for calculations can be further shortened.

The first characteristic amount may be the directions of gradient vectors or color data, of each pixel of an image, and the second characteristic amounts may be the direction and magnitude of gradient vectors, of each pixel of an image. In this case, accurate discrimination regarding whether the predetermined subject is included in the target image can be performed, employing characteristic amounts which are comparatively easy to calculate from an image.

A configuration may be adopted wherein: judgment is made regarding whether the discrimination result by the first discriminating means satisfies predetermined requirements; and in the case that the judgment is affirmative, the candidate discriminated by the first discriminating means is judged to be the predetermined subject. By adopting this configuration, the calculation of the normalized second characteristic amounts and the second discrimination can be omitted in the case that the first discrimination is accurately performed. Thereby, discrimination regarding whether the predetermined subject is included in the target image can be performed at an even higher speed.

By extracting the predetermined subject, which has been discriminated in the target image, the predetermined subject can be accurately extracted from the target image.

A configuration may be adopted wherein data that represents the position of the predetermined subject within the target image is attached to the target image, and output therewith. In this case, the predetermined subject can be accurately extracted from the target image, by referring to the data attached thereto.

The second subject discriminating apparatus of the present invention comprises:

an image input means for receiving a target image, which is a target of discrimination;

a characteristic amount calculating means for calculating at least one characteristic amount, which is employed in discriminating a predetermined subject that includes at least one structural component, from the target image;

a first discriminating means for discriminating whether the predetermined subject is included in the target image, by referring to first reference data in which the at least one characteristic amount and discrimination conditions corresponding to the at least one characteristic amount are defined in advance, with the at least one characteristic amount calculated from the target image while the target image is deformed in a stepwise manner within a variance corresponding to a first predetermined allowable range, wherein the first reference data is obtained by learning the at least one characteristic amount within a plurality of sample images, in which the positions and/or the positional relationships of the at least one structural component are normalized within the first predetermined allowable range, and a plurality of sample image groups, which are known to not include the predetermined subject, with a machine learning technique; and a second discriminating means for discriminating the positions of the at least one structural component included in the target image, by referring to second reference data in which the at least one characteristic amount and discrimination conditions corresponding to the at least one characteristic amount are defined in advance, with the at least one characteristic amount calculated from the target image while the target image is deformed in a stepwise manner within a variance corresponding to a second predetermined allowable range which is smaller than the first allowable range in the case that the first discriminating means judges that the predetermined subject is included in the target image, wherein the second reference data is obtained by learning the at least one characteristic amount within a plurality of sample images, in which the positions and/or the positional relationships of the at least one structural component are normalized within the second predetermined allowable range, and a plurality of sample image groups, which are known to not include the predetermined subject, with a machine learning technique.

The "structural components" refer to components which are necessarily included in the predetermined subject. In the case that the predetermined subject is a face, the structural components are eyes, a nose, a mouth, etc. In the case that the predetermined subject is a vehicle, the structural components are headlights and the like. In the case that the predetermined subject is a road sign, the structural components are specific marks included in the road sign and the like.

The phrase " . . . the positions and/or the positional relationships of the at least one structural component are normalized . . . " refers to resizing all of the sample images which are known to include the predetermined subject so that they are of a uniform size, as well as uniformizing the positions and/or the positional relationships of the structural components. Specifically, in the case that the predetermined subject is a face and the structural components are eyes, the sizes of the sample images are made uniform (30×30 pixels, for example), the center positions of both eyes are uniformized, and the distance between the centers of both eyes are set to be ten pixels.

The phrase " . . . normalized within the first predetermined allowable range . . . " refers to providing sample images in which the positions and/or the positional relationships of the structural components are slightly varied, in addition to the sample images in which the positions and/or the positional relationships of the structural components are uniformized. Specifically, the distances between eyes may be varied within a range of 9 to 11 pixels in some sample images, as opposed to only 10 pixels as described above. In addition, faces within the sample images may be rotated within a predetermined range. In this manner, sample images, which are normalized within a predetermined allowable range, are obtained.

The "machine learning technique" may be a known technique, such as neural network technique, a boosting technique, and the like.

In the second subject discriminating apparatus of the present invention, in the case that the predetermined subject is a face, the first discriminating means may obtain the first reference data, by learning the at least one characteristic amount within a first region that includes a left eye and left cheek, and within a second region that includes a right eye and right cheek, of the sample images which are known to include the predetermined subject, and by learning the at least one characteristic amount within regions corresponding to the first and second regions, of the sample images which are known to not include the predetermined subject; and the first characteristic amount calculating means may be a means for calculating the at least one characteristic amount of regions that correspond to the first and second regions within the target image.

Further, the first discriminating means may obtain the first reference data, by learning the at least one characteristic amount within a third region that includes both eyes, of the sample images which are known to include the predetermined subject, and by learning the at least one characteristic amount within regions corresponding to the third region, of the sample images which are known to not include the predetermined subject; and the first characteristic amount calculating means may be a means for calculating the at least one characteristic amount of regions that correspond to the first, second, and third regions within the target image.

In the second subject discriminating apparatus of the present invention, in the case that the predetermined subject is a face, the second discriminating means may obtain the second reference data, by learning the at least one characteristic amount within a first region that includes a left eye and left cheek, and within a second region that includes a right eye and right cheek, of the sample images which are known to include the predetermined subject, and by learning the at least one characteristic amount within regions corresponding to the first and second regions, of the sample images which are known to not include the predetermined subject; and the second characteristic amount calculating means may be a means for calculating the at least one characteristic amount of regions that correspond to the first and second regions within the target image.

Further, the second discriminating mean may obtain the second reference data, by learning the at least one characteristic amount within a third region that includes both eyes, of the sample images which are known to include the predetermined subject, and by learning the at least one characteristic amount within regions corresponding to the third region, of the sample images which are known to not include the predetermined subject; and the second characteristic amount calculating means may be a means for calculating the at least one characteristic amount of regions that correspond to the first, second, and third regions within the target image.

Note that in the second subject discriminating apparatus of the present invention, the at least one characteristic amount may be at least one of the direction of a gradient vector, the magnitude of the gradient vector, and color data, of each pixel of the target image.

The "gradient vector" represents the direction and the magnitude of density change of each pixel within an image.

The second subject discriminating apparatus of the present invention may further comprise:

an extracting means for extracting the predetermined subject from the target image, employing the positions of the discriminated structural components as a reference.

The second subject discriminating apparatus of the present invention may further comprise:

an output means for attaching data that represents the positions of the structural components within the target image, and outputting the data with the target image.

The second subject discriminating method of the present invention comprises the steps of:

receiving a target image, which is a target of discrimination;

calculating at least one characteristic amount, which is employed in discriminating a predetermined subject that includes at least one structural component, from the target image;

discriminating whether the predetermined subject is included in the target image, by referring to first reference data in which the at least one characteristic amount and discrimination conditions corresponding to the at least one characteristic amount are defined in advance, with the at least one characteristic amount calculated from the target image while the target image is deformed in a stepwise manner within a variance corresponding to a first predetermined allowable range, wherein the first reference data is obtained by learning the at least one characteristic amount within a plurality of sample images, in which the positions and/or the positional relationships of the at least one structural component are normalized within the first predetermined allowable range, and a plurality of sample image groups, which are known to not include the predetermined subject, with a machine learning technique; and discriminating the positions of the at least one structural component included in the target image, by referring to second reference data in which the at least one characteristic amount and discrimination conditions corresponding to the at least one characteristic amount are defined in advance, with the at least one characteristic amount calculated from the target image while the target image is deformed in a stepwise manner within a variance corresponding to a second predetermined allowable range which is smaller than the first allowable range in the case that the first discriminating means judges that the predetermined subject is included in the target image, wherein the second reference data is obtained by learning the at least one characteristic amount within a plurality of sample images, in which the positions and/or the positional relationships of the at least one structural component are normalized within the second predetermined allowable range, and a plurality of sample image groups, which are known to not include the predetermined subject, with a machine learning technique.

Note that the second subject discriminating method of the present invention may be provided as a program that causes a computer to execute the method.

According to the second subject discriminating apparatus and the second subject discriminating method of the present invention, the at least one characteristic amount is calculated from the target image. Then, the first reference data is referred to with the at least one characteristic amount, and whether the target image includes the predetermined subject is discriminated (first discrimination). If it is judged that the target image includes the predetermined subject, the second reference data is referred to with the at least one characteristic amount, and the positions of the structural components, which are included in the predetermined subject, are discriminated (second discrimination).

Here, it is possible to perform the second discrimination to discriminate the positions of the structural components, without performing the first discrimination. However, the learning, which is performed to obtain the second reference data, employs sample images in which the positions and/or the positional relationships of the at least one structural component are normalized. Therefore, although the positions of the structural components can be accurately discriminated, it becomes necessary to deform the entire target image in a stepwise manner within a variance corresponding to the smaller second predetermined allowable range, in order to perform the second discrimination by referring to the second reference data. As a result, the process requires a long period of time.

On the other hand, learning of the first reference data employs sample images in which the positions and/or the positional relationships of the structural components are normalized with the greater first predetermined allowable range. Therefore, the stepwise deformation of the target image can be greater in comparison to the stepwise deformation during reference to the second reference data. As a result, the amount of calculations required for discrimination can be reduced, to perform the process at high speed. However, the accuracy in discriminating the positions of the structural component is low.

In the second subject discrimination apparatus and method of the present invention, the first discrimination discriminates the predetermined subject, then the second discrimination is performed only on the predetermined subject. Therefore, the amount of calculations is reduced compared to a case in which the entire target image is subjected to the second discrimination. As a result, the amount of time required for the discrimination process is shortened. Accordingly, the positions of the structural components that constitute the predetermined subjects, which are included in the target images, can be performed at high speed and with high accuracy.

The first and second reference data are obtained by learning in advance using a machine learning technique. Therefore, discrimination capabilities during discrimination of the predetermined subject and of the positions of the structural components can be further improved.

In the case that the predetermined subject is a face, the characteristic amounts of the first region that includes the left eye and the left cheek, the second region that includes the right eye and the right cheek, and the third region that includes both eyes, of the sample images, may be utilized during the learning process. Thereby, the time required for learning can be greatly shortened. In addition, it has been empirically confirmed by the present inventors that use of the characteristic amounts included in the first, second and third regions greatly contribute to improvement in discrimination capabilities, during discrimination regarding whether the predetermined subject is included in the target image. For this reason, the discrimination capabilities can be further improved by utilizing the characteristic amounts included in the first, second, and third regions during learning of the first and second reference data.

In addition, the range, from within which the characteristic amounts are calculated, is reduced by calculating the first and second characteristic amounts from the first, second, and third regions of the target image. Therefore, the time required for calculations can be further shortened.

The at least one characteristic amount may be at least one of the direction of a gradient vector, the magnitude of the gradient vector, and color data, of each pixel of the target image. In this case, accurate discrimination regarding whether the predetermined subject is included in the target image can be performed, employing characteristic amounts which are comparatively easy to calculate from an image.

By extracting the predetermined subject, based on the discriminated positions of the structural components, the predetermined subject can be accurately extracted from the target image.

A configuration may be adopted wherein data that represents the discriminated positions of the structural components are attached to the target image, and output therewith. In this case, the predetermined subject can be accurately extracted from the target image, by referring to the data attached thereto.

The third subject discriminating apparatus of the present invention comprises:

an image input means for receiving input of a target image, which is a target of discrimination;

a characteristic amount calculating means for calculating at least one characteristic amount, which is employed in discriminating a predetermined subject that includes at least one structural component, from the target image;

a discriminating means for discriminating whether the predetermined subject is included in the target image, by referring to reference data in which the at least one characteristic amount and discrimination conditions corresponding to the at least one characteristic amount are defined in advance, with the at least one characteristic amount calculated from the target image, while the target image is deformed in a stepwise manner within a variance corresponding to a first predetermined allowable range, wherein the reference data is obtained by learning the at least one characteristic amount within a plurality of sample images, in which the positions and/or the positional relationships of the at least one structural component are normalized within the first predetermined allowable range, and a plurality of sample image groups, which are known to not include the predetermined subject, with a machine learning technique, and for discriminating the positions of the at least one structural component included in the predetermined subject in the case that the predetermined subject is included in the target image.

Note that in the case that the predetermined subject is a face and the structural components are eyes, the discriminating means may obtain the reference data by learning the at least one characteristic amount within a first region that includes a left eye and left cheek, and within a second region that includes a right eye and right cheek, of the sample images which are known to include the predetermined subject, and by learning the at least one characteristic amount within regions corresponding to the first and second regions, of the sample images which are known to not include the predetermined subject; and the characteristic amount calculating means may be a means for calculating the at least one characteristic amount of regions that correspond to the first and second regions within the target image.

Further, the discriminating means may obtain the reference data, by learning the at least one characteristic amount within a third region that includes both eyes, of the sample images which are known to include the predetermined subject, and by learning the at least one characteristic amount within regions corresponding to the third region, of the sample images which are known to not include the predetermined subject; and the characteristic amount calculating means may be a means for calculating the at least one characteristic amount of regions that correspond to the first, second, and third regions within the target image.

In the third subject discriminating apparatus of the present invention, the at least one characteristic amount may be at least one of the direction of a gradient vector, the magnitude of the gradient vector, and color data, of each pixel of the target image.

The third subject discriminating apparatus of the present invention may further comprise:

an extracting means for extracting the predetermined subject from the target image, employing the positions of the discriminated structural components as a reference.

The third subject discriminating apparatus of the present invention may further comprise:

an output means for attaching data that represents the positions of the structural components within the target image, and outputting the data with the target image.

The photography apparatus of the present invention, such as a digital camera, a cellular phone with a built in camera, and the like, is characterized by being equipped with the first, second, or third subject discriminating apparatus of the present invention.

The third subject discriminating method of the present invention comprises the steps of:

receiving input of a target image, which is a target of discrimination;

calculating at least one characteristic amount, which is employed in discriminating a predetermined subject that includes at least one structural component, from the target image;

discriminating whether the predetermined subject is included in the target image, by referring to reference data in which the at least one characteristic amount and discrimination conditions corresponding to the at least one characteristic amount are defined in advance, with the at least one characteristic amount calculated from the target image, while the target image is deformed in a stepwise manner within a variance corresponding to a first predetermined allowable range, wherein the reference data is obtained by learning the at least one characteristic amount within a plurality of sample images, in which the positions and/or the positional relationships of the at least one structural component are normalized within the first predetermined allowable range, and a plurality of sample image groups, which are known to not include the predetermined subject, with a machine learning technique; and discriminating the positions of the at least one structural component included in the predetermined subject, in the case that the predetermined subject is included in the target image.

Note that the third subject discriminating method of the present invention may be provided as a program that causes a computer to execute the method.

In the third subject discriminating apparatus and the third subject discriminating method of the present invention, at least one characteristic amount is calculated from the target image. Then, the reference is referred to with the at least one characteristic amount, while the target image is deformed with the predetermined variance, to discriminate whether the predetermined subject is included in the target image. In the case that it is judged that the target image includes the predetermined subject, the positions of the structural components, which are included in the predetermined subject, are discriminated.

Here, the sample images known to include the predetermined subject, which are employed during learning to obtain the reference data, have the positions and/or positional relationships of the structural components therein normalized. Therefore, in the case that it is discriminated that the target image includes the predetermined subject, the position of the at least one structural component of the predetermined subject is the same as that of the at least one structural component of the sample images. In addition, even if the at least one structural component of the predetermined subject is obscured or otherwise unclear in the target image, as long as the characteristic amounts that represent the characteristics of the predetermined subject are included in the target image, it is possible to discriminate whether the predetermined subject is included in the target image, and further, to discriminate the positions of the at least one structural component of the predetermined subject. Accordingly, according to the third subject discriminating apparatus and the third subject discriminating method of the present invention, it is possible to accurately discriminate the positions of the at least one structural component, even if the at least one structural component of the predetermined subject is unclear within the target image.

In the case that the predetermined subject is a face, the characteristic amounts of the first region that includes the left eye and the left cheek, the second region that includes the right eye and the right cheek, and the third region that includes both eyes, of the sample images, may be utilized during the learning process. Thereby, the time required for learning can be greatly shortened. In addition, it has been empirically confirmed by the present inventors that use of the characteristic amounts included in the first, second and third regions greatly contribute to improvement in discrimination capabilities, during discrimination regarding whether the predetermined subject is included in the target image. For this reason, the discrimination capabilities can be further improved by utilizing the characteristic amounts included in the first, second, and third regions during learning of the first and second reference data.

In addition, the range, from within which the characteristic amounts are calculated, is reduced by calculating the first and second characteristic amounts from the first, second, and third regions of the target image. Therefore, the time required for calculations can be further shortened, compared to a case in which the characteristic amounts are calculated from the entire target image.

Further, the reference data are obtained by learning in advance, using a machine learning technique. Therefore, the discrimination capabilities during discrimination of the predetermined subject and the positions of the structural components can be further improved.

The at least one characteristic amount may be at least one of the direction of a gradient vector, the magnitude of the gradient vector, and color data, of each pixel of the target image. In this case, accurate discrimination regarding whether the predetermined subject is included in the target image can be performed, employing characteristic amounts which are comparatively easy to calculate from an image.

By extracting the predetermined subject, based on the discriminated positions of the structural components, the predetermined subject can be accurately extracted from the target image.

A configuration may be adopted wherein data that represents the discriminated positions of the structural components are attached to the target image, and output therewith. In this case, the predetermined subject can be accurately extracted from the target image, by referring to the data attached thereto.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

BRIEF DESCRIPTION OF THE DRAWINGS

FIG. 1 is a block diagram that illustrates the schematic construction of a subject discriminating apparatus according to a first embodiment of the present invention.

FIG. 2A illustrates a horizontal edge detecting filter.

FIG. 2B illustrates a vertical edge detecting filter.

FIG. 3 is a diagram for explaining the calculation of gradient vectors.

FIG. 9 illustrates a method in which a discriminator is derived.

FIG. 10 illustrates a state in which a first region that includes a left eye and left cheek, a second region that includes the right eye and right cheek, and a third region that includes both eyes are set in a sample image.

FIG. 11 illustrates deformed sample images, in which the first, second, and third regions are set.

FIG. 12 is a diagram for explaining stepwise deformation of a target image.

FIG. 13 is a flow chart that illustrates the processes performed by the first embodiment.

FIG. 18A and FIG. 18B are diagrams for explaining the center positions of eyes, wherein FIG. 18A is a diagram in which eyes are facing front, and FIG. 18B is a diagram in which eyes are looking toward the right.

DESCRIPTION OF THE PREFERRED EMBODIMENTS

Figure 4A:
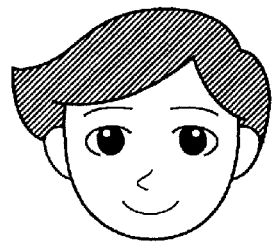
FIG. 4A illustrates a human face.

Hereinafter, embodiments of the present invention will be described with reference to the attached drawings. FIG. 1 is a block diagram that illustrates the schematic construction of a subject discriminating apparatus 1 according to a first embodiment of the present invention. As illustrated in FIG. 1, the subject discriminating apparatus 1 of the first embodiment comprises: an image input portion 2; a characteristic amount calculating means 4; a memory 6; a first discriminating portion 8; a second discriminating portion 10, and an output portion 12. The image input portion 2 receives input of a target image data set S0, which represents a target image to be discriminated. The characteristic amount calculating means 4 calculates first characteristic amounts C1 and second characteristic amounts C2 from the target image S0 (hereinafter, the reference number S0 will be utilized to refer to both the target image data set and the target image represented thereby). The memory 6 stores therein first reference data R1 and second reference data R2, to be described later. The first discriminating portion 8 discriminates whether a candidate for a human face (hereinafter, simply referred to as "candidate"), which is a predetermined subject, is included in the target image S0, based on the first characteristic amounts C1, calculated by the characteristic amount calculating means 4, and the first reference data R1, stored in the memory 6. The second discriminating portion 10 discriminates whether the candidate is actually a human face, based on the second characteristic amounts C2, calculated by the characteristic amount calculating means 4, and the second reference data R2, stored in the memory 6, in the case that the first discriminating portion 8 judges that the target image S0 includes the candidate. The output portion 12 outputs the discrimination results of the first discriminating portion 8 and the second discriminating portion 10.

The characteristic amount calculating means 4 calculates the first characteristic amounts C1, which do not require normalization, from the target image S0, and also calculates the second characteristic amounts C2 from an image of a candidate, which is extracted as will be described later. Specifically, directions of gradient vectors within the target image S0 are calculated as the first characteristic amounts C1. Gradient vectors (that is, the directions and magnitudes thereof) within the image of the candidate are calculated as the second characteristic amounts C2. Hereinafter, calculation of the gradient vectors will be described. First, the characteristic amount calculating means 4 detects edges in the horizontal direction within the target image S0, by administering a filtering process with a horizontal edge detecting filter as shown in FIG. 2A. The characteristic amount calculating means 4 also detects edges in the vertical direction within the target image S0, by administering a filtering process with a vertical edge detecting filter as shown in FIG. 2B. Then, gradient vectors K, for each pixel of the target image S0, are calculated from the size H of horizontal edges and the size V of the vertical edges, as illustrated in FIG. 3.

The direction of the gradient vector K is the first characteristic amount C1. Specifically, a value between 0 and 359, representing the degrees of an angle that the gradient vector K forms with a predetermined direction (The X direction in FIG. 3, for example), is the first characteristic amount C1.

Figure 4B:
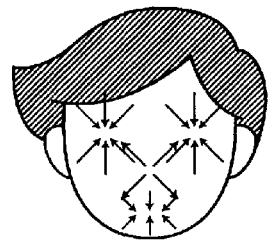
FIG. 4B illustrates gradient vectors in the vicinity of the eyes and the mouth of the human face of FIG. 4A.

In the case that an image pictures a human face therein such as that illustrated in FIG. 4A, the gradient vectors K, which are calculated in the manner described above, are directed toward the centers of eyes and mouths, which are dark, and are directed away from noses, which are bright, as illustrated in FIG. 4B. In addition, the magnitudes of the gradient vectors K are greater for the mouths than for the eyes, because changes in density are greater for the mouths than for the eyes.

Figure 5A:
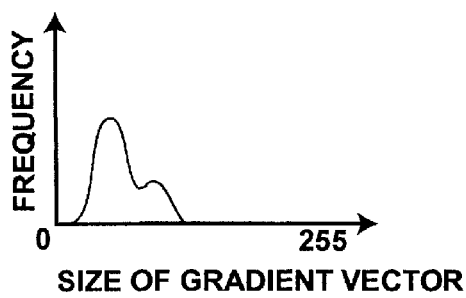
FIG. 5A is a histogram that illustrates the magnitudes of gradient vectors prior to normalization.
Figure 5B:
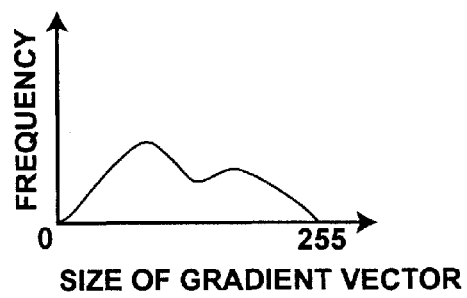
FIG. 5B is a histogram that illustrates the magnitudes of gradient vectors following normalization.
Figure 5C:
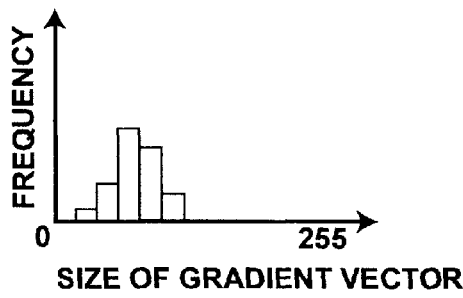
FIG. 5C is a histogram that illustrates the magnitudes of gradient vectors, which have been pentanarized.
Figure 5D:
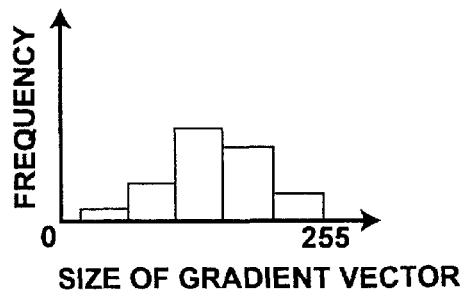
FIG. 5D is a histogram that illustrates the magnitudes of gradient vectors, which have been pentanarized and normalized.

Here, the second characteristic amounts C2 are only calculated within the image of the candidate. In addition, the magnitudes of the gradient vectors K, which are the second characteristic amounts C2, are normalized. The normalization is performed in the following manner. First, a histogram that represents the magnitudes of the gradient vectors K of all of the pixels within the image of the candidate is derived. Then, the magnitudes of the gradient vectors K are corrected, by flattening the histogram so that the distribution of the magnitudes is evenly distributed across the range of values assumable by each pixel of the candidate image (0 through 255 in the case that the image data is 8 bit data). For example, in the case that the magnitudes of the gradient vectors K are small and concentrated at the low value side of the histogram as illustrated in FIG. 5A, the histogram is redistributed so that the magnitudes are distributed across the entire range from 0 through 255, as illustrated in FIG. 5B. Note that in order to reduce the amount of calculations, it is preferable that the distribution range of the gradient vectors K in a histogram be divided into five, for example, as illustrated in FIG. 5C. Then, the gradient vectors K are normalized by redistributing the histogram such that the frequency distribution, which has been divided into five, is distributed across the entire range of values from 0 through 255, as illustrated in FIG. 5D.

During photography, the brightness and direction of illumination vary depending on photography conditions. Therefore, the brightness and the direction of illumination differ for each target image S0. If the gradient vectors K are derived from each of the target images S0 as they are, in which the brightness and the direction of illumination are different, the magnitudes of the gradient vectors K at the position of eyes differ, even though the images are all of faces. Therefore, it is not possible to accurately discriminate whether the candidate is actually a face. In this case, the magnitudes of the gradient vectors K may be normalized for all of the pixels of the target images S0. However, normalization requires a great amount of calculations, which in turn requires a great amount of time for the normalization process. For this reason, the present invention reduces the processing time by reducing the amount of calculations, by normalizing the second characteristic amounts C2 only for the candidate image which has been discriminated by the first discriminating portion 8.

Note that as will be described later, the characteristic amount calculating means 4 calculates the first characteristic amounts C1 and the second characteristic amounts C2 at each step of deformation of the target image S0 and the candidate image.

The first reference data R1, which is stored in the memory 6, defines discrimination conditions for combinations of the first characteristic amounts C1 for each pixel of each of a plurality of types of pixel groups, which are constituted by a plurality of pixels selected from sample images, to be described later. The second reference data R2, which is stored in the memory 6, defines discrimination conditions for combinations of the second characteristic amounts C2 for each pixel of each of a plurality of types of pixel groups, which are constituted by a plurality of pixels selected from the sample images.

The combinations of the first characteristic amounts C1, the second characteristic amounts C2, and the discrimination conditions within the first reference data R1 and the second reference data R2 are set in advance by learning. The learning is performed by employing an image group comprising a plurality of sample images, which are known to be of faces, and a plurality of sample images, which are known to not be of faces.

Figure 6:
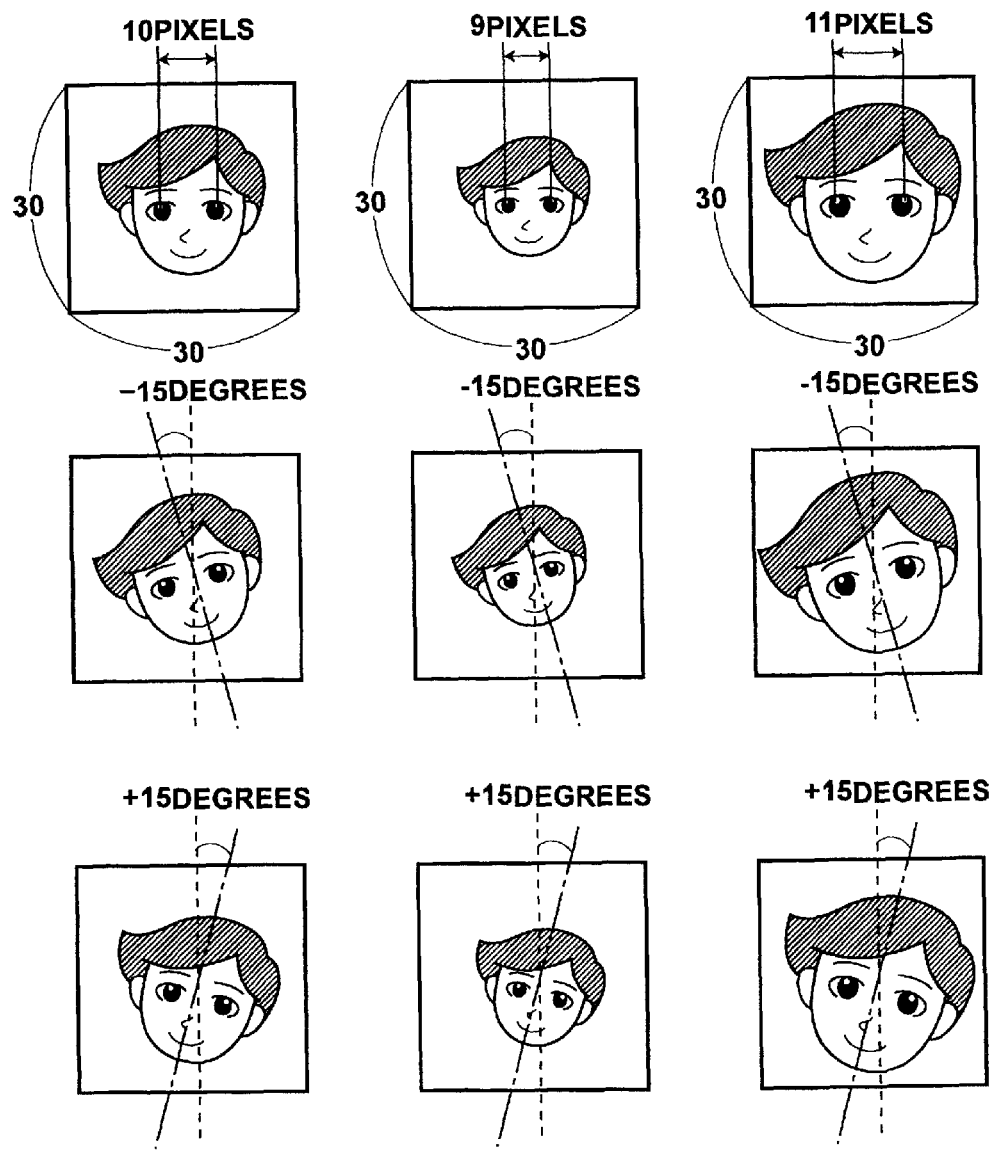
FIG. 6 illustrates examples of sample images, which are known to include human faces.

Note that in the present embodiment, the sample images, which are known to be of faces, have the following specifications. That is, the sample images are of a 30×30 pixel size, the distances between the centers of the eyes of each face within the images are one of 9, 10, or 11 pixels, and the faces are rotated stepwise in three degree increments within a range of ±15 degrees from the vertical (that is, the rotational angles are −15 degrees, −12 degrees, −9 degrees, −6 degrees, 0 degrees, 3 degrees, 6 degrees, 9 degrees, 12 degrees, and 15 degrees). Accordingly, 33 sample images (3×11) are prepared for each face. Here, the positions of the eyes in the vertical direction, in the state that the face is vertically oriented, are the same for all of the sample images. Note that only sample images which are rotated −15 degrees, 0 degrees, and 15 degrees are illustrated in FIG. 6. The centers of rotation are the intersections of the diagonals of the sample images. Arbitrary images of a size 30×30 pixels are employed as the sample images which are known to not be of faces.

Consider a case in which sample images, in which the distance between the eyes are 10 pixels and the rotational angle is 0 degrees (that is, the faces are in the vertical orientation), are employed exclusively to perform learning. In this case, only those candidates and faces, in which the distance between the eyes are 10 pixels and which are not rotated at all, would be discriminated by referring to the first reference data R1 and the second reference data R2. The sizes of the faces, which are possibly included in the target images S0, are not uniform in size. Therefore, during discrimination regarding whether a candidate is included in the target image or regarding whether a candidate is a face, the target image S0 is enlarged/reduced, to enable discrimination of a face of a size that matches that of the sample images. However, in order to maintain the distance between the centers of the eyes accurately at ten pixels, it is necessary to enlarge and reduce the target image S0 in a stepwise manner with magnification rates in 1.1 units, thereby causing the amount of calculations to be great.

Figure 7A:
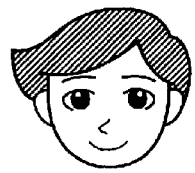
FIG. 7A, FIG. 7B, and FIG. 7C are diagrams for explaining rotation of faces.
Figure 7B:
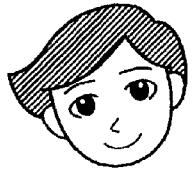
Figure 7C:

In addition, faces, which are possibly included in the target images S0, are not only those which have rotational angles of 0 degrees, as that illustrated in FIG. 7A. There are cases in which the faces in the target images are rotated, as illustrated in FIG. 7B and FIG. 7C. However, in the case that sample images, in which the distance between the eyes are 10 pixels and the rotational angle is 0 degrees, are employed exclusively to perform learning, rotated faces such as those illustrated in FIG. 7B and FIG. 7C would not be discriminated as faces.

For these reasons, the present embodiment imparts an allowable range to the first reference data R1 and the second reference data R2. This is accomplished by employing sample images, which are known to be of faces, in which the distances between the centers of the eyes are 9, 10, and 11 pixels, and which are rotated in a stepwise manner in three degree increments within a range of ±15 degrees. Thereby, the target image S0 may be enlarged/reduced in a stepwise manner with magnification rates in 11/9 units, which enables reduction of the time required for calculations, compared to a case in which the target image S0 is enlarged/reduced with magnification rates in 1.1 units. In addition, rotated faces, such as those illustrated in FIG. 7B and FIG. 7C, are also enabled to be discriminated.

Figure 8:
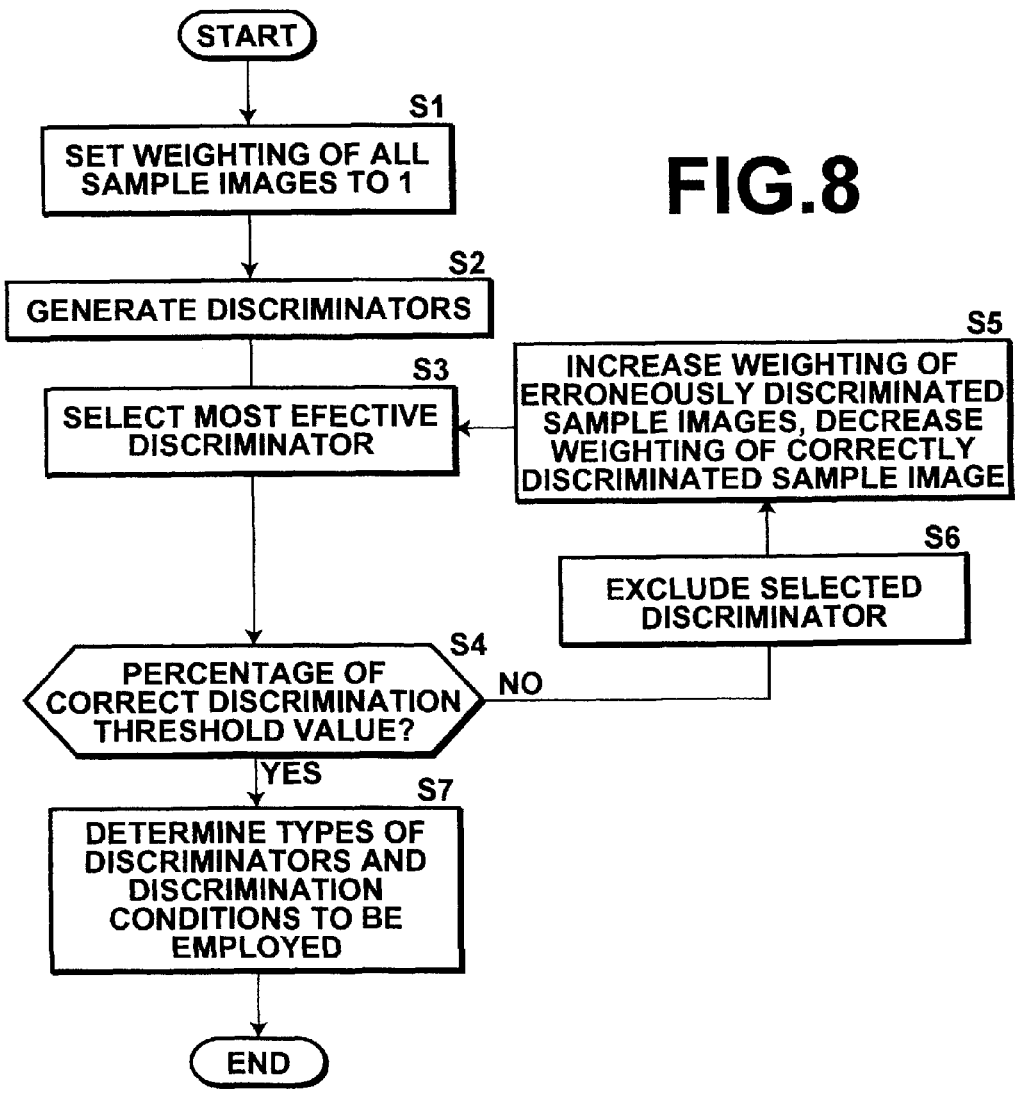
FIG. 8 is a flowchart illustrating the technique with which reference data is learned.

Hereinafter, an example of a learning technique employing the sample images will be described with reference to the flow chart of FIG. 8. Note that here, learning of the second reference data will be described.

The sample images, which are the subject of learning, comprise a plurality of sample images, which are known to be of faces, and a plurality of sample images, which are known to not be of faces. Note that the in sample images, which are known to be of faces, the distances between the centers of the eyes of each face within the images are one of 9, 10, or 11 pixels, and the faces are rotated stepwise in three degree increments within a range of ±15 degrees from the vertical. Each sample image is weighted, that is, is assigned a level of importance. First, the initial values of weighting of all of the sample images are set equally to 1 (step S1).

Next, discriminators are generated for each of the different types of pixel groups of the sample images (step S2). Here, each discriminator has a function of providing a reference to discriminate images of faces from those not of faces, by employing combinations of the second characteristic amounts C2, for each pixel that constitutes a single pixel group. In the present embodiment, histograms of combinations of the second characteristic amounts C2 for each pixel that constitutes a single pixel group are utilized as the discriminators.

The generation of a discriminator will be described with reference to FIG. 9. As illustrated in the sample images at the left side of FIG. 9, the pixels that constitute the pixel group for generating the discriminator are: a pixel P1 at the center of the right eye; a pixel P2 within the right cheek; a pixel P3 within the forehead; and a pixel P4 within the left cheek, of the sample images which are known to be of faces. Combinations of the second characteristic amounts C2 of the pixels P1 through P4 are obtained for all of the sample images, which are known to be of faces, and histograms thereof are generated. Here, the second characteristic amounts C2 represent the directions and magnitudes of the gradient vectors K. However, there are 360 possible values (0 through 359) for the direction of the gradient vector K, and 256 possible values (0 through 255) for the magnitude thereof. If these values are employed as they are, the number of combinations would be four pixels at 360×256 per pixel, or $(360×256)^4$, which would require a plurality of samples, time, and memory for learning and detection. For this reason, in the present embodiment, the directions of the gradient vectors K are quaternarized, that is, set so that: values of 0 through 44 and 315 through 359 are converted to a value of 0 (right direction); values of 45 through 134 are converted to a value of 1 (upper direction); values of 135 through 224 are converted to a value of 2 (left direction); and values of 225 through 314 are converted to a value of 3 (lower direction). The magnitudes of the gradient vectors K are ternarized so that their values assume one of three values, 0 through 2. Then, the values of the combinations are calculated employing the following formulas.

Value of Combination=0 (in the case that the magnitude of the gradient vector is 0); and Value of Combination=(direction of the gradient vector+1)×magnitude of the gradient vector (in the case that the magnitude of the gradient vector>0).

Due to the above quaternarization and ternarization, the possible number of combinations becomes $9^4$, thereby reducing the amount of data of the second characteristic amounts C2.

In a similar manner, histograms are generated for the plurality of sample images, which are known to not be of faces. Note that in the sample images, which are known to not be of faces, pixels (denoted by the same reference numerals P1 through P4) at positions corresponding to the pixels P1 through P4 of the sample images, which are known to be of faces, are employed in the calculation of the second characteristic amounts C2. Logarithms of the ratios of the frequencies in the two histograms are represented by the rightmost histogram illustrated in FIG. 9, which is employed as the discriminator. According to the discriminator, images that have distributions of the second characteristic amounts C2 corresponding to positive discrimination points therein are highly likely to be of faces. The likelihood that an image is of a face increases with an increase in the absolute values of the discrimination points. On the other hand, images that have distributions of the second characteristic amounts C2 corresponding to negative discrimination points of the discriminator are highly likely to not be of faces. Again, the likelihood that an image is not of a face increases with an increase in the absolute values of the negative discrimination points. A plurality of discriminators in histogram format regarding combinations of the second characteristic amounts C2 of each pixel of the plurality of types of pixel groups, which are utilized during discrimination, in step S2.

Thereafter, a discriminator, which is most effective in discriminating whether an image is of a face, is selected from the plurality of discriminators generated in step S2. The selection of the most effective discriminator is performed while taking the weighting of each sample image into consideration. In this example, the percentages of correct discriminations provided by each of the discriminators are compared, and the discriminator having the highest weighted percentage of correct discriminations is selected (step S3). At the first step S3, all of the weighting of the sample images are equal, at 1. Therefore, the discriminator that correctly discriminates whether sample images are of faces with the highest frequency is selected as the most effective discriminator. On the other hand, the weightings of each of the sample images are renewed at step S5, to be described later. Thereafter, the process returns to step S3. Therefore, at the second step S3, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step S3's, more importance is placed on correctly discriminating heavily weighted sample images than lightly weighted sample images.

Next, confirmation is made regarding whether the percentage of correct discriminations of a combination of the discriminators which have been selected exceeds a predetermined threshold value (step S4). That is, the percentage of discrimination results regarding whether sample images are of faces, which are obtained by the combination of the selected discriminators, that match the actual sample images is compared against the predetermined threshold value. Here, the sample images, which are employed in the evaluation of the percentage of correct discriminations, may be those that are weighted with different values, or those that are equally weighted. In case that the percentage of correct discriminations exceeds the predetermined threshold value, whether an image is of a face can be discriminated by the selected discriminators with sufficiently high accuracy, therefore the learning process is completed. In the case that the percentage of correct discriminations is less than or equal to the predetermined threshold value, the process proceeds to step S6, to select an additional discriminator, to be employed in combination with the discriminators which have been selected thus far.

The discriminator, which has been selected at the immediately preceding step S3, is excluded from selection in step S6, so that it is not selected again.

Next, the weighting of sample images, which were not correctly discriminated by the discriminator selected at the immediately preceding step S3, is increased, and the weighting of sample images, which were correctly discriminated, is decreased (step S5). The reason for increasing and decreasing the weighting in this manner is to place more importance on images which were not correctly discriminated by the discriminators that have been selected thus far. In this manner, selection of a discriminator which is capable of correctly discriminating whether these sample images are of a face is encouraged, thereby improving the effect of the combination of discriminators.

Thereafter, the process returns to step S3, and another effective discriminator is selected, using the weighted percentages of correct discriminations as a reference.

The above steps S3 through S6 are repeated to select discriminators corresponding to combinations of the second characteristic amounts C2 for each pixel that constitutes specific pixel groups, which are suited for discriminating whether faces are included in images. If the percentages of correct discriminations, which are evaluated at step S4, exceed the threshold value, the type of discriminator and discrimination conditions, which are to be employed in discrimination regarding whether images include faces, are determined (step S7), and the learning of the second reference data R2 is completed.

Learning of the first reference data R1 is performed in a manner similar to that described above, by obtaining types of discriminators and discrimination conditions.

Note that in the case that the learning technique described above is applied, the discriminators are not limited to those in the histogram format. The discriminators may be of any format, as long as they provide references to discriminate between images of faces and other images by employing combinations of the first characteristic amounts C1 and the second characteristic amounts C2 of each pixel that constitutes specific pixel groups. Examples of alternative discriminators are: binary data, threshold values, functions, and the like. As a further alternative, a histogram that represents the distribution of difference values between the two histograms illustrated in the center of FIG. 9 may be employed, in the case that the discriminators are of the histogram format.

The learning technique is not limited to that which has been described above. Other machine learning techniques, such as a neural network technique, may be employed. Note that the first reference data R1 and the second reference data R2 may alternatively be determined by an experienced technician.

Regarding the learning technique described above, pixels within a first region A1, which includes a left eye and a left cheek, and a second region A2, which includes a right eye and a right cheek, of sample images, which are known to be of faces, may be employed exclusively as the pixels that constitute pixel groups for generating the discriminators, as illustrated in FIG. 10. Further, pixels within a third region A3, which includes both eyes and is denoted by broken lines in FIG. 10, may be employed, in addition to those within the first region A1 and the second region A2.

In this case, the positions of the regions A1, A2, and A3 are set to be uniform in all of the sample images employed in the learning process. That is, in the present embodiment, the learning of the first reference data R1 and the second reference data R2 is performed employing sample images of faces, in which the distances between the centers of the eyes are one of 9, 10, or 11 pixels, and the faces are rotated stepwise in three degree increments within a range of ±15 degrees from the vertical. The positions of the regions A1, A2, and A3 within the rotated sample images are set to be the same as the positions of the regions A1, A2, and A3 within the sample images in which the distance between the centers of the eyes are 10 pixels, and the rotational angle is 0 degrees. In addition, the positions of the regions A1, A2, and A3 within sample images, which are known to not be of faces, are set to be the same as the positions of the regions A1, A2, and A3 within the sample images of faces, in which the distance between the centers of the eyes are 10 pixels, and the rotational angle is 0 degrees. Accordingly, the discriminators are generated by employing the pixels within the regions A1, A2, and A3, which have been set for all of the sample images as illustrated in FIG. 11, exclusively.

By generating the discriminators by employing only the pixels within the first region A1, the second region A2, and the third region A3 during the learning process, the time required to learn the first reference data R1 and the second reference data R2 can be greatly shortened.

In addition, it has been empirically confirmed by the present inventors that use of the pixels within the first, second and third regions A1, A2, and A3 greatly contribute to improvement in discrimination capabilities, during discrimination regarding whether a face is included in the target image S0. For this reason, the discrimination capabilities can be further improved by utilizing only the pixels within the first, second, and third regions A1, A2 and A3 during learning of the first reference data R1 and the second reference data R2.

The first discriminating portion 8 refers to the discrimination conditions of the first reference data R1, which has been learned regarding every combination of the first characteristic amounts C1 of each pixel that constitutes a plurality of types of pixel groups. Thereby, the discrimination points of the combinations of the first characteristic amounts C1 of each pixel that constitutes each of the pixel groups are obtained. Whether a candidate is included in the target image S0 is discriminated by totaling the discrimination points. At this time, the first characteristic amounts C1, which are the directions of the gradient vectors K, are quaternarized, for example, in a manner similar to the quaternarization performed during learning of the first reference data R1. In the present embodiment, discrimination is performed based on whether the sum of all of the discrimination points is positive or negative. For example, in the case that the total sum of the discrimination points is positive, it is judged that a candidate is included in the target image S0. In the case that the total sum of the discrimination points is negative, it is judged that a candidate is not included in the target image S0. Note that the discrimination, performed by the first discriminating portion 8 regarding whether a candidate is included in the target image S0, is referred to as a first discrimination.

Here, the sizes of the target images S0 are varied, unlike the sample images, which are 30×30 pixels. In addition, in the case that a face is included in the target image S0, the face is not necessarily in the vertical orientation. For these reasons, the first discrimination portion 8 enlarges/reduces the target image S0 in a stepwise manner (FIG. 12 illustrates a reduction process), so that the size thereof becomes 30 pixels either in the vertical or horizontal direction. In addition, the target image S0 is rotated in a stepwise manner over 360 degrees. A mask M, which is 30×30 pixels large, is set on the target image S0, at every stepwise increment of the enlargement/reduction. The mask M is moved one pixel at a time on the target image S0, and whether a candidate is included in the target image S0 is discriminated, by discriminating whether the image within the mask is that of a face.

Note that during learning of the first reference data R1 and the second reference data R2, sample images are utilized, in which the distances between the centers of the eyes are one of 9, 10, and 11 pixels. Therefore, the magnification rate during enlargement/reduction of the target image S0 and of the candidate may be set to be 11/9. In addition, during learning of the first reference data R1 and the second reference data R2, sample images are utilized, in which faces are rotated within a range of ±15 degrees. Therefore, the target image S0 and the candidate may be rotated over 360 degrees in 30 degree increments.

Here, the characteristic amount calculating portion 4 calculates the first and second characteristic amounts C1 and C2 from the target image S0 and the candidate at each step of their stepwise enlargement/reduction and rotational deformation.

Note that the first reference data R1 and the second reference data R2 may be learned by generating discriminators employing pixels within the first region A1, the second region A2, and the third region A3 of the sample images, exclusively. In this case, the characteristic amount calculating means 4 calculates the first and second characteristic amounts C1 and C2 only for pixels within regions of the mask M that correspond to the first region A1, the second region A2, and the third region A3.

Discrimination regarding whether a candidate is included in the target image S0 is performed at every step in the stepwise enlargement/reduction ad rotational deformation thereof. In the case that a candidate is discriminated once, the target image S0 is discriminated to include the candidate. A region 30×30 pixels large, corresponding to the position of the mask M at the time of discrimination, is extracted from the target image S0 at the step in the stepwise size and rotational deformation at which the candidate was discriminated.

The second discriminating portion 10 deforms the candidate extracted by the first discriminating portion 8 by stepwise enlargement/reduction and rotation, in a similar manner as performed by the first discriminating portion 8. The second discriminating portion 10 refers to the discrimination conditions of the second reference data R2, which has been learned regarding every combination of the second characteristic amounts C2 of each pixel that constitutes a plurality of types of pixel groups. Thereby, the discrimination points of the combinations of the second characteristic amounts C2 of each pixel that constitutes each of the pixel groups are obtained. Whether the candidate is a face is discriminated by totaling the discrimination points. The second characteristic amounts C2 are the directions and the magnitudes of the gradient vectors K. The directions of the gradient vectors K are quaternarized, and the magnitudes thereof are ternarized. In the present embodiment, discrimination is performed based on whether the sum of all of the discrimination points is positive or negative. For example, in the case that the total sum of the discrimination points is positive, it is judged that the candidate is a face. In the case that the total sum of the discrimination points is negative, it is judged that the candidate is not a face. Note that the discrimination, performed by the second discriminating portion 10 regarding whether a candidate is a face, is referred to as a second discrimination.

The output portion 12 outputs discrimination results indicating that the target image S0 does not include a face, in the case that the first discriminating portion 8 judges that a candidate is not included in the target image S0, or in the case that the second discriminating portion 10 judges that the candidate discriminated by the first discriminating portion 8 is not a face. On the other hand, in the case that the second discriminating portion 10 judges that the candidate discriminated by the first discriminating portion 8 is a face, the output portion 12 extracts the face, which has been discriminated by the second discriminating portion 10, and outputs face image data S1, which represents an image of the extracted face.

Next, the processes performed by the first embodiment will be described. FIG. 13 is a flow chart that illustrates the processes performed by the first embodiment. First, the image input portion 2 receives input of target image data S0 (step S11). At this time, a series of target image data S0 representing a plurality of images may be received continuously. Next, the characteristic amount calculating means 4 calculates the directions of the gradient vectors K of the target image S0, as the first characteristic amounts C1, at each step in the stepwise enlargement/reduction and rotation thereof (step S12). Then, the first discriminating portion 8 reads the first reference data R1 out from the memory 6 (step S13), and performs the first discrimination regarding whether the target image S0 includes a candidate (step S14).

If the discrimination result at step S14 is positive, the first discriminating portion 8 extracts the candidate from the target image S0 (step S15). Note that a plurality of candidates may be extracted. Next, the characteristic amount calculating means 4 calculates the second characteristic amounts C2 from the candidate, at each step in the stepwise enlargement/reduction and rotation thereof (step S16), and normalizes the second characteristic amounts C2 (step S17). Thereafter, the second discriminating portion 10 reads the second reference data R2 out from the memory 6 (step S18), and performs the second discrimination regarding whether the candidate is a face (step S19).

If the discrimination result at step S19 is positive, the output portion 12 extracts the face, which has been discriminated from the target image S0, outputs face image data S1 (step S20), and the processes are completed.

If the discrimination results at step S14 or step S19 are negative, it is judged that the target image S0 does not include a face, the output portion 12 outputs discrimination results indicating that a face is not included in the target image S0 (step S21), and the processes are completed.

In this manner, the first discriminating portion 8 of the subject discriminating apparatus 1 according to the first embodiment employs the directions of the gradient vectors K as the first characteristic amounts C1, which do not require normalization. Therefore, the amount of calculations is not excessive even if discrimination regarding whether a candidate is included is performed on the entire target image S0. As a result, discrimination regarding whether a candidate is included in the target image S0 can be performed at a comparatively high speed. Meanwhile, the second discriminating portion 10 normalizes the directions and magnitudes of the gradient vectors K, as the second characteristic amounts C2. Therefore, discrimination can be performed with high accuracy, although the amount of calculations increases. However, in the present embodiment, the second characteristic amounts are normalized and the second discrimination is performed only on the candidate portions, which are extracted from the target image S0. Therefore, the amount of calculations is decreased. As a result, the amount of time required for the discrimination process is shortened. Accordingly, the present embodiment enables highly accurate discrimination regarding whether a face is included in the target image S0, at high speed.

Note that the first and second characteristic amounts C1 and C2 may be calculated for regions of the target image S0 that correspond to the first region A1, the second region A2, and the third region A3 of the sample images. Thereby, the range for which the first and second characteristic amounts C1 and C2 are calculated is decreased, in comparison to a case in which the first and second characteristic amounts C1 and C2 are calculated for the entire target image S0. Accordingly, the time required for calculations can be further shortened.

Figure 14:
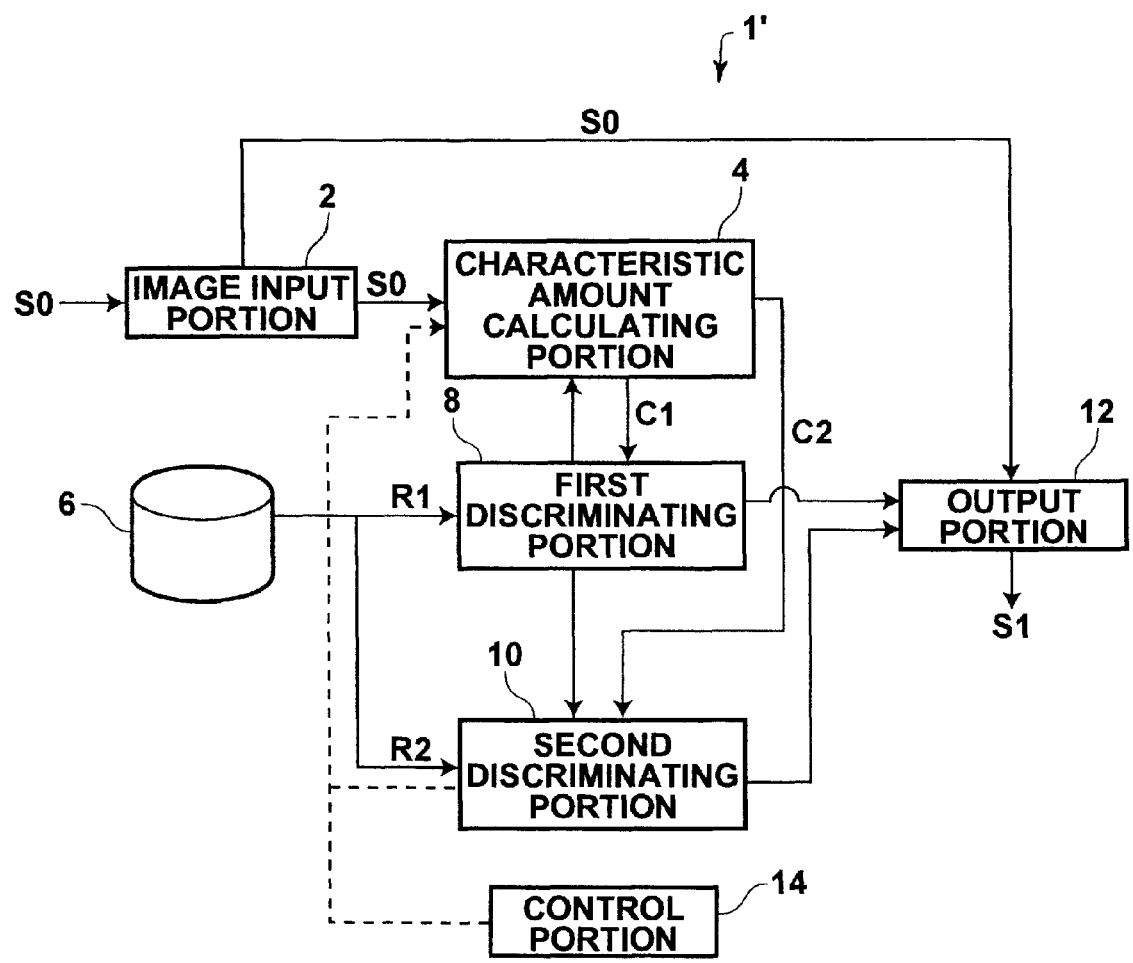
FIG. 14 is a block diagram that illustrates the schematic construction of a subject discriminating apparatus according to a second embodiment of the present invention.

Next, a second embodiment of the present invention will be described. FIG. 14 is a block diagram that illustrates the schematic construction of a subject discriminating apparatus 1' according to the second embodiment of the present invention. Note that components of the second embodiment which are the same as those of the first embodiment are denoted by the same reference numerals, and detailed descriptions thereof are omitted. The subject discriminating apparatus 1' according to the second embodiment comprises a control portion 14, in addition to the image input portion 2, the characteristic amount calculating portion 4, the memory 6, the first discriminating portion 8, the second discriminating portion 10, and the output portion 12, that constitute the subject discriminating apparatus 1 according to the first embodiment. The control portion 14 judges whether the discrimination result by the first discriminating portion 8 satisfies predetermined requirements. In the case that the judgment is affirmative, the control portion 14 controls the characteristic amount calculating portion 4, the first discriminating portion 8, and the second discriminating portion 10 so that a candidate discriminated by the first discriminating portion 8 is judged to be a face, without the second discriminating means 10 performing the second discrimination.

After the first discrimination and the second discrimination are initiated with respect to target image data S0 and the number of target image data S0, for which discrimination has been performed, reaches a predetermined number, the control portion 14 compares the number of times N1 that the first discriminating portion 8 judges that a candidate is included in the target image S0 against the number of times N2 that the second discriminating portion 10 judges that the candidate is a face. Whether the discrimination results of the first discriminating portion 8 satisfies the predetermined requirements is judged by determining whether a ratio N2/N1 is a predetermined percentage (95%, for example) or greater. If the result of the judgment is affirmative, it is judged that the discrimination accuracy of the candidates by the first discriminating portion 88 is extremely high. Therefore, the characteristic amount calculating portion 4 calculates only the first characteristic amounts C1 from target image data S0, which are subsequently discriminated, and only discrimination regarding whether the target image S0 includes a candidate is performed by the first discriminating portion 8. In the case that a candidate is discriminated in the target image S0, the candidate is judged to be a face. The control portion 14 controls the characteristic amount calculating portion 4, the first discriminating portion 8, the second discriminating portion 10, and the output portion 12 to output the discrimination results obtained by the first discriminating portion 8.

Next, the processes performed by the second embodiment will be described. Note that the processes performed by the image input portion 2, the characteristic amount calculating portion 4, the memory 6, the first discriminating portion 8, the second discriminating portion 10, and the output portion 12 of the second embodiment are the same as those performed by the first embodiment. Therefore, only the processes performed by the control portion 14 will be described.

Figure 15:
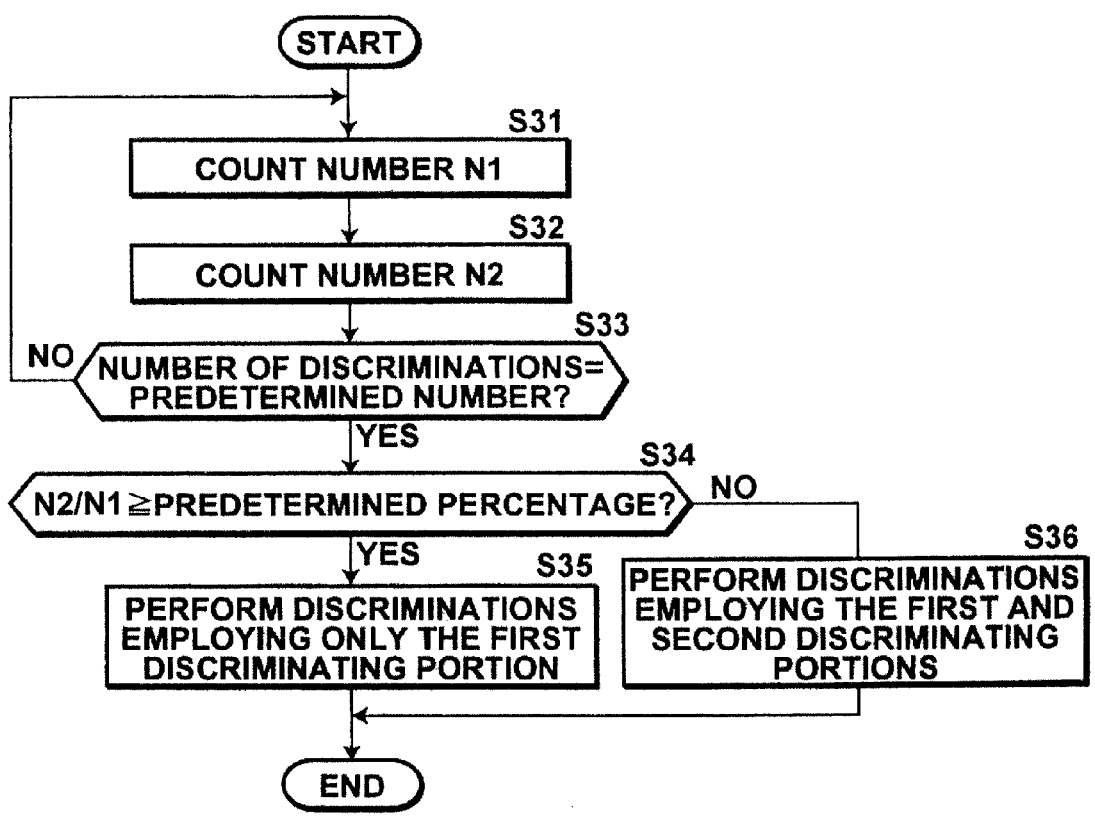
FIG. 15 is a flow chart that illustrates the processes performed by a control portion of the second embodiment.

FIG. 15 is a flow chart that illustrates the processes performed by the control portion 14 of the second embodiment. When processes for discriminating whether a face is included in the target image S0 are initiated, the control portion 14 begins its process, by counting the number of times N1 that a candidate is discriminated within the target image S0 by the first discriminating portion 8 (step S31). Meanwhile, the number of times N2 that the second discriminating portion 10 discriminates that the candidate is a face is also counted (step S32).

Next, the control portion 14 judges whether the number of discriminated target images S0 (that is, the number of discriminations performed) has reached the predetermined number (step S33). If the judgment at step S33 is negative, the process returns to step S31, and the processes performed at steps S31 through S33 are repeated until the judgment at step S33 is affirmative. When the judgment at step S33 is affirmative, judgment is made regarding whether the ratio N2/N1 is greater than or equal to the predetermined percentage (step S34).

If the judgment at step S34 is affirmative, the characteristic amount calculating portion 4, the first discriminating portion 8, and the second discriminating portion 10 are controlled so that discrimination regarding whether the target image S0 includes a face is performed by calculating only the first characteristic amounts C1, and by employing only the first discriminating portion 8 (step S35), and the processes are completed. On the other hand, if the judgment at step S34 is negative, characteristic amount calculating portion 4, the first discrimination portion 8, and the second discriminating portion 10 are controlled so that discrimination regarding whether the target image S0 includes a face is performed by continuing to calculate the first and second characteristic amounts C1 and C2, and by employing the first discriminating portion 8 and the second discriminating portion 10 (step 36), and the processes are completed.

In this manner, the second embodiment judges whether the discrimination results by the first discriminating portion 8 satisfies the predetermined requirements. In the case that the judgment is affirmative, subsequent discriminations regarding whether faces are included in target images S0 are performed by calculating only the first characteristic amounts C1 and by employing only the first discriminating portion 8. For this reason, in the case that the first discriminating portion is performing discrimination with high accuracy, the calculation of the normalized second characteristic amounts C2, and the second discrimination by the second discriminating portion 10 can be omitted. Accordingly, discrimination regarding whether target images S0 include faces therein can be performed at even higher speeds.

Note that in the first and second embodiments described above, the first reference data R1 and the second reference data R2 are stored in the memory 6, within the subject discriminating apparatuses 1 and 1'. However, as long as the characteristic amount calculating portion 4, the first discriminating portion 8 and the second discriminating portion 10 are enabled to access the first reference data R1 and the second reference data R2, the reference data may be recorded in an apparatus separate from the subject discriminating apparatuses 1 and 1', or in removable media, such as CD-ROM's.

The first and second embodiments employ the directions of the gradient vectors K as the first characteristic amounts C1, which do not require normalization. However, color data, such as hue and chroma, of the target image S0 also do not change due to changes in brightness or contrast of the target image S0. Therefore, color data of the target image S0 may be employed as the first characteristic amounts C1.

Faces are the predetermined subjects in the first and second embodiments, and discrimination is performed regarding whether faces are included in the target images S0. However, subjects having substantially uniform shapes, and which are capable of being resized to approximate a substantially uniform size during the learning process, such as vehicles and road signs, may alternatively be the predetermined subject.

In the first and second embodiments, the output portion 12 extracts the face from the target image S0. Alternatively, facial position data (for example, coordinates of the four corners of a rectangular region that surrounds a discriminated face) that represents the position of the face within the target image S0 may be attached to the target image data S0, and output therewith. The facial position data may be written into the header or the tag of the target image data S0, to attach the facial position data to the target image data S0. Alternatively, a file having the same file name as the target image data S0 with a different file extension, such as a text file, may be inseparably integrated with the target image data S0. Note that in the case that it is discriminated that the target image S0 does not include a face, discrimination data representing this discrimination result may be attached to the target image data S0 and output therewith.

In the first and second embodiments, the characteristic amount calculating portion 4 calculates both the first and second characteristic amounts C1 and C2. Alternatively, separate characteristic amount calculating portions may be provided, which are dedicated to calculating the first characteristic amounts C1 and the second characteristic amounts C2 respectively.

Figure 16:
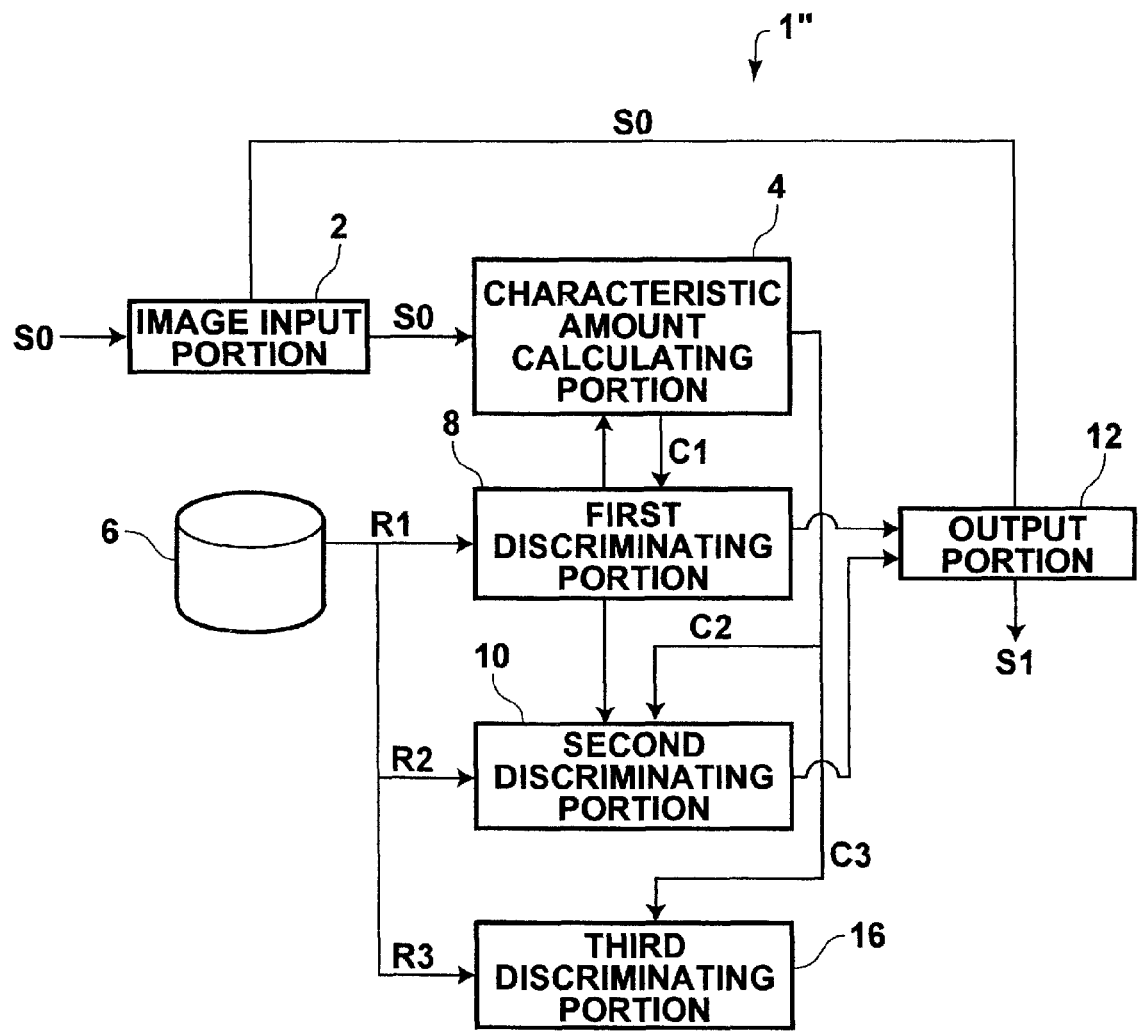
FIG. 16 is a block diagram that illustrates the schematic construction of a subject discriminating apparatus according to a third embodiment of the present invention.

In the first and second embodiments, two discriminating portions 8 and 10 are employed. Alternatively, a third discriminating portion 16 may be provided, as in the subject discriminating apparatus 1″ according to a third embodiment of the present invention, illustrated in FIG. 16.

The third discriminating portion 16 of the subject discriminating apparatus 1″ according to the third embodiment refers to third reference data R3, obtained by learning third characteristic amounts C3 different from the first and second characteristic amounts C1 and C2, and performs discrimination regarding whether the face discriminated by the second discriminating portion 10 is actually a face, based on third characteristic amounts C3 calculated from the target image S0. By providing the third discriminating portion 16, the discrimination accuracy, during discriminations regarding whether faces are included in target images S0, is further improved. Note that in the third embodiment, the third discriminating portion 16 is provided in addition to the first and second discriminating portions 8 and 10. However, a plurality of additional discriminating portions may be provided.

Subject discriminating apparatuses according to the first through third embodiments of the present invention have been described above. Programs that cause a computer to execute the functions performed by the image input portion 2, the characteristic amount calculating portion 4, the memory 6, the first discriminating portion 8, the second discrimination portion 10, the output portion 12, the control portion 14, and the third discriminating portion 16, are also within the scope of the present invention. In addition, computer readable media having these programs recorded therein are also within the scope of the present invention. In these cases as well, the reference data may be included within the programs or the recording media, or alternatively, be recorded in separate apparatuses or separate media.

Figure 17:
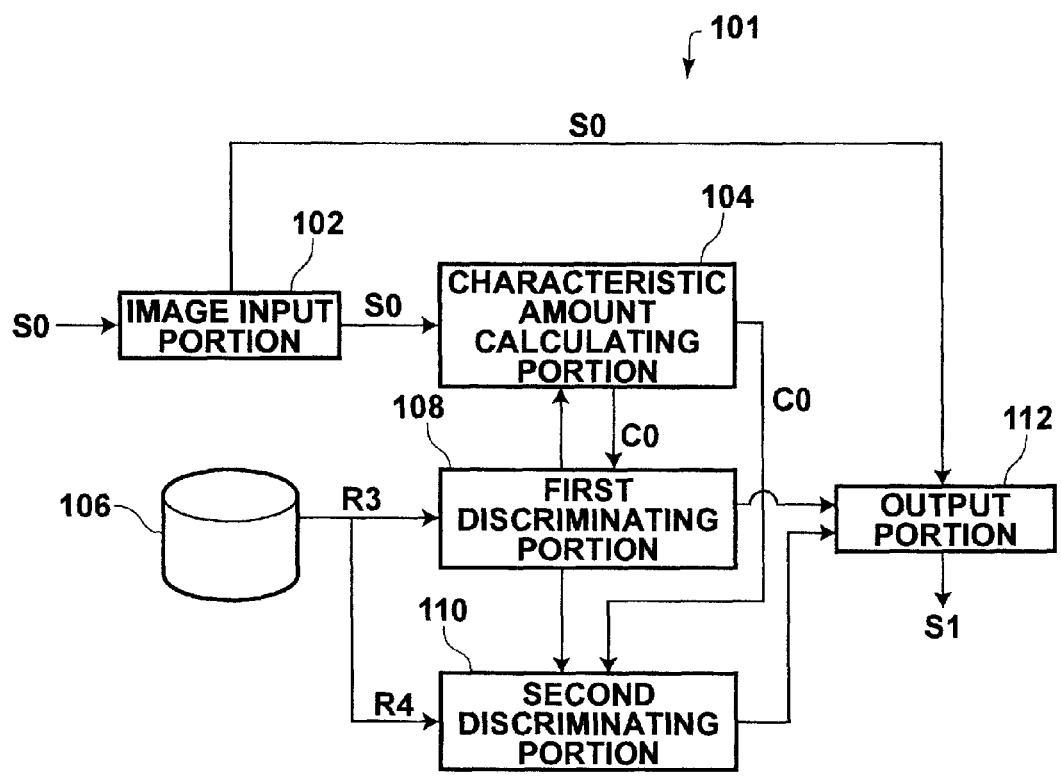
FIG. 17 is a block diagram that illustrates the schematic construction of a subject discriminating apparatus according to a fourth embodiment of the present invention.

Hereinafter, a fourth embodiment of the present invention will be described with reference to the attached drawings. FIG. 17 is a block diagram that illustrates the schematic construction of a subject discriminating apparatus 101 according to the fourth embodiment of the present invention. As illustrated in FIG. 17, the subject discriminating apparatus 101 comprises: an image input portion 102; a characteristic amount calculating means 104; a memory 106; a first discriminating portion 108; a second discriminating portion 110, and an output portion 112. The image input portion 102 receives input of a target image data set S0, which represents a target image to be discriminated. The characteristic amount calculating means 104 calculates characteristic amounts C0 from the target image S0 (hereinafter, the reference number S0 will be utilized to refer to both the target image data set and the target image represented thereby). The memory 106 stores therein third reference data R3 and fourth reference data R4, to be described later. The first discriminating portion 108 discriminates whether a human face, which is a predetermined subject, is included in the target image S0, based on the characteristic amounts C0, calculated by the characteristic amount calculating means 104, and the third reference data R3, stored in the memory 106. The second discriminating portion 110 discriminates the positions of eyes within a face, based on the characteristic amounts C0, calculated by the characteristic amount calculating means 104 and the fourth reference data R4, stored in the memory 6, in the case that the first discriminating portion 108 judges that the target image S0 includes the face. The output portion 112 outputs the discrimination results of the first discriminating portion 108 and the second discriminating portion 110.

Figure 18A:
Figure 18B:

Note that the "positions of eyes" in the fourth embodiment refers to the center positions between the corners of the eyes. In the case that the eyes face front, as illustrated in FIG. 18A, the centers are the irises (denoted by X's in FIG. 18A). In the case that the eyes are looking toward the right, as illustrated in FIG. 18B, the centers are not the irises, but the whites of the eyes.

The characteristic amount calculating portion 104 calculates the characteristic amounts C0, to be employed in the discrimination of faces, from the target image S0. In the case that it is discriminated that a face is included in the target image S0, the characteristic amount calculating portion 104 calculates the characteristic amounts C0 from an image of the face (hereinafter, simply referred to as "facial image"), which is extracted as will be described later. Specifically, gradient vectors (the directions and magnitudes of density change at each pixel of the target image S0 and the facial image) are calculated as the characteristic amounts C0, similar to the second characteristic amounts C2 of the first embodiment.

The third and fourth reference data R3 and R4, which are stored in the memory 106, define discrimination conditions for combinations of the characteristic amounts C0 for each pixel of each of a plurality of types of pixel groups, which are constituted by a plurality of pixels selected from sample images, to be described later.

The combinations of the first characteristic amounts C1, the second characteristic amounts C2, and the discrimination conditions within the first reference data R1 and the second reference data R2 are set in advance by learning. The learning is performed by employing an image group comprising a plurality of sample images, which are known to be of faces, and a plurality of sample images, which are known to not be of faces.

Note that in the fourth embodiment, the sample images, which are employed during generating of the third reference data R3 and are known to be of faces, have the following specifications. That is, the sample images are of a 30×30 pixel size, the distances between the centers of the eyes of each face within the images are one of 9, 10, or 11 pixels, and the faces are rotated stepwise in three degree increments within a range of ±15 degrees from the vertical (that is, the rotational angles are −15 degrees, −12 degrees, −9 degrees, −6 degrees, 0 degrees, 3 degrees, 6 degrees, 9 degrees, 12 degrees, and 15 degrees), as illustrated in FIG. 6.

Figure 19:
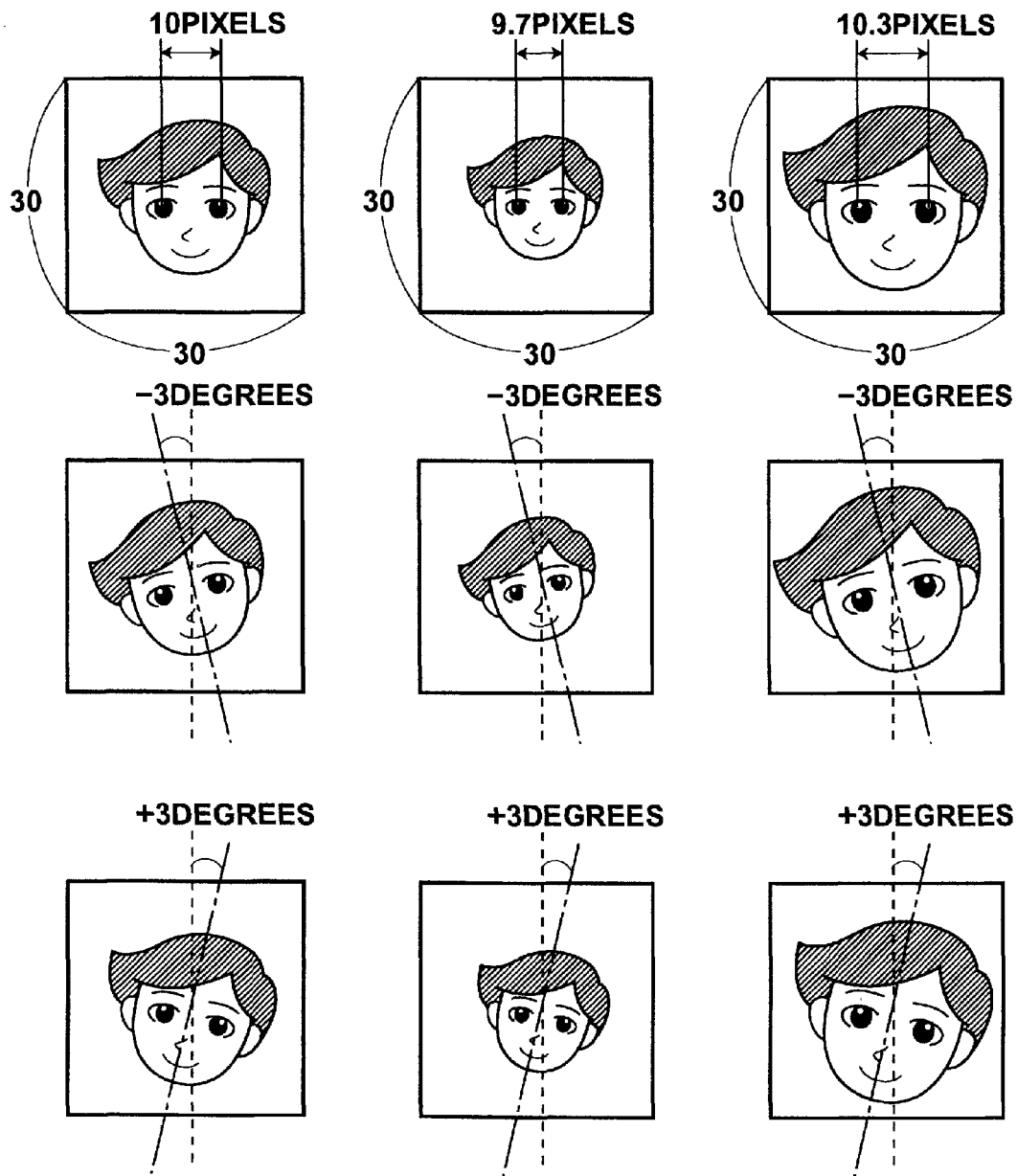
FIG. 19 illustrates examples of sample images, which are known to include human faces, employed in learning of reference data in the fourth embodiment.

Meanwhile, the sample images, which are employed during generating of the fourth reference data R4 and are known to be of faces, have the following specifications. That is, the sample images are of a 30×30 pixel size, the distances between the centers of the eyes of each face within the images are one of 9.7, 10, or 10.3 pixels, and the faces are rotated stepwise in one degree increments within a range of ±3 degrees from the vertical (that is, the rotational angles are −3 degrees, −2 degrees, −1 degree, 0 degrees, 1 degree, 2 degrees, and 3 degrees), as illustrated in FIG. 19. Accordingly, 21 sample images (3×7) are prepared for each face. Note that only sample images which are rotated −3 degrees, 0 degrees, and 3 degrees are illustrated in FIG. 19. The centers of rotation are the intersections of the diagonals of the sample images. Note that sample images in which the distances between the centers of the eyes are 10 pixels may be enlarged/reduced in order to obtain sample images in which the distances between the centers of the eyes are 9.7 and 10.3 pixels, then the enlarged/reduced sample images may be resized to 30×30 pixels.

The center positions of the eyes within the sample images, which are employed in the learning of the fourth reference data R4, are the targets of discrimination in the fourth embodiment.

Arbitrary images of a size 30×30 pixels are employed as the sample images which are known to not be of faces.

The sample images, which are employed during the learning of the fourth reference data R4, have distances between the centers of the eyes of each face therein being one of 9.7, 10, or 10.3 pixels, and the faces are rotated stepwise in one degree increments within a range of ±3 degrees from the vertical, as illustrated in FIG. 19. Therefore, the allowable range is smaller in comparison to the third reference data R3. During discrimination by the second discriminating portion 110, to be described later, it is necessary to enlarge/reduce the target images S0 at magnification rates in 10.3/9.7 units. Therefore, the time required for calculations during the discrimination by the second discriminating portion 110 is longer, compared to the time required for calculations during the discrimination by the first discriminating portion 108. However, the second discriminating portion 110 performs discrimination regarding only the images of faces, which are discriminated by the first discriminating portion 108. Therefore, the amount of calculations required to discriminate the positions of eyes is reduced, compared to a case in which the entirety of the target images S0 are discriminated.

Note that the learning technique employed to obtain the third and fourth reference data R3 and R4 is the same as that described in the first embodiment, and a detailed description thereof will be omitted.

During the learning process, pixels within a first region A1, which includes a left eye and a left cheek, and a second region A2, which includes a right eye and a right cheek, of sample images, which are known to be of faces, may be employed exclusively as the pixels that constitute pixel groups for generating discriminators in the same manner as that of the first embodiment, as illustrated in FIG. 10. Further, pixels within a third region A3, which includes both eyes and is denoted by broken lines in FIG. 10, may be employed, in addition to those within the first region A1 and the second region A2.

The first discriminating portion 108 refers to the discrimination conditions of the third reference data R3, which has been learned regarding every combination of the characteristic amounts C0 of each pixel that constitutes a plurality of types of pixel groups. Thereby, the discrimination points of the combinations of the characteristic amounts C0 of each pixel that constitutes each of the pixel groups are obtained. Whether a face is included in the target image S0 is discriminated by totaling the discrimination points. At this time, the directions of the gradient vectors K, are quaternarized, and the magnitudes thereof are ternarized. In the fourth embodiment, discrimination is performed based on whether the sum of all of the discrimination points is positive or negative. For example, in the case that the total sum of the discrimination points is positive, it is judged that a face is included in the target image S0. In the case that the total sum of the discrimination points is negative, it is judged that a face is not included in the target image S0. Note that the discrimination, performed by the first discriminating portion 108 regarding whether a face is included in the target image S0, is referred to as a first discrimination.

Here, the sizes of the target images S0 are varied, unlike the sample images, which are 30×30 pixels. In addition, in the case that a face is included in the target image S0, the face is not necessarily in the vertical orientation. For these reasons, the first discrimination portion 108 enlarges/reduces the target image S0 in a stepwise manner as illustrated in FIG. 12, so that the size thereof becomes 30 pixels either in the vertical or horizontal direction. In addition, the target image S0 is rotated in a stepwise manner over 360 degrees. A mask M, which is 30×30 pixels large, is set on the target image S0, at every stepwise increment of the enlargement/reduction. The mask M is moved one pixel at a time on the target image S0, and whether a candidate is included in the target image S0 is discriminated, by discriminating whether the image within the mask is that of a face.

Note that during learning of the third reference data R3, sample images are utilized, in which the distances between the centers of the eyes are one of 9, 10, and 11 pixels. Therefore, the magnification rate during enlargement/reduction of the target image S0 and of the candidate may be set to be 11/9. In addition, during learning of the third reference data R3, sample images are utilized, in which faces are rotated within a range of ±15 degrees. Therefore, the target image S0 and the candidate may be rotated over 360 degrees in 30 degree increments.

Here, the characteristic amount calculating means 104 calculates the characteristic amounts C0 at each step of deformation of the target image S0.

Note that the third reference data R3 may be learned by generating discriminators employing pixels within the first region A1, the second region A2, and the third region A3 of the sample images, exclusively. In this case, the characteristic amount calculating means 4 calculates the characteristic amounts C0 only for pixels within regions of the mask M that correspond to the first region A1, the second region A2, and the third region A3.

Discrimination regarding whether a face is included in the target image S0 is performed at every step in the stepwise enlargement/reduction ad rotational deformation thereof. In the case that a face is discriminated once, the target image S0 is discriminated to include the face. A region 30×30 pixels large, corresponding to the position of the mask M at the time of discrimination, is extracted from the target image S0 at the step in the stepwise size and rotational deformation at which the candidate was discriminated.

The second discriminating portion 110 refers to the discrimination conditions of the fourth reference data R4, which has been learned regarding every combination of the characteristic amounts C0 of each pixel that constitutes a plurality of types of pixel groups, during discrimination of the facial image, extracted by the first discriminating portion 108. Thereby, the discrimination points of the combinations of the characteristic amounts C0 of each pixel that constitutes each of the pixel groups are obtained. The positions of the eyes are discriminated by totaling the discrimination points. The characteristic amounts C0 are the directions and the magnitudes of the gradient vectors K. At this time, the directions of the gradient vectors K are quaternarized, and the magnitudes thereof are ternarized.

Here, the second discriminating portion 110 deforms the facial image extracted by the first discriminating portion 108 by stepwise enlargement/reduction and rotation. A mask M, which is 30×30 pixels large, is set on the facial image, at every stepwise increment of the enlargement/reduction and rotation. The mask M is moved one pixel at a time on the facial image, and the positions of eyes within the image within the mask M is discriminated.

Note that during learning of the fourth reference data R4, sample images are utilized, in which the distances between the centers of the eyes are one of 9.7, 10, and 10.3 pixels. Therefore, the magnification rate during enlargement/reduction of the target image S0 and of the candidate may be set to be 10.3/9.7. In addition, during learning of the fourth reference data R4, sample images are utilized, in which faces are rotated within a range of ±3 degrees. Therefore, the target image S0 and the candidate may be rotated over 360 degrees in 6 degree increments.

The characteristic amount calculating means 104 calculates the characteristic amounts C0 at each step in the stepwise enlargement/reduction and rotation of the facial image.

Note that the fourth reference data R4 may be learned by generating discriminators employing pixels within the first region A1, the second region A2, and the third region A3 of the sample images, exclusively. In this case, the characteristic amount calculating means 104 calculates the characteristic amounts C0 only for pixels within regions of the mask M that correspond to the first region A1, the second region A2, and the third region A3.

In the fourth embodiment, the discrimination points are added at each step in the stepwise deformation of the extracted facial image. The step of deformation at which the total sum of the discrimination points within the 30×30 pixel size mask M is the greatest is determined. The upper left corner of the facial image within the mask M is set as the origin of a coordinate system. The coordinates of the positions of the eyes (x1, y1) and (x2, y2) are obtained, and positions corresponding to these coordinates in the target image, prior to deformation thereof, are discriminated as the positions of the eyes.

The output portion 112 outputs discrimination results indicating that the target image S0 does not include a face, in the case that the first discriminating portion 108 judges that a face is not included in the target image S0. On the other hand, the facial image is extracted from the target image S0, by trimming a region having a predetermined range, using the positions of the eyes discriminated by the second discriminating portion 110 as a reference. The output portion 112 outputs face data S1, which represents the extracted facial image.

Figure 20:
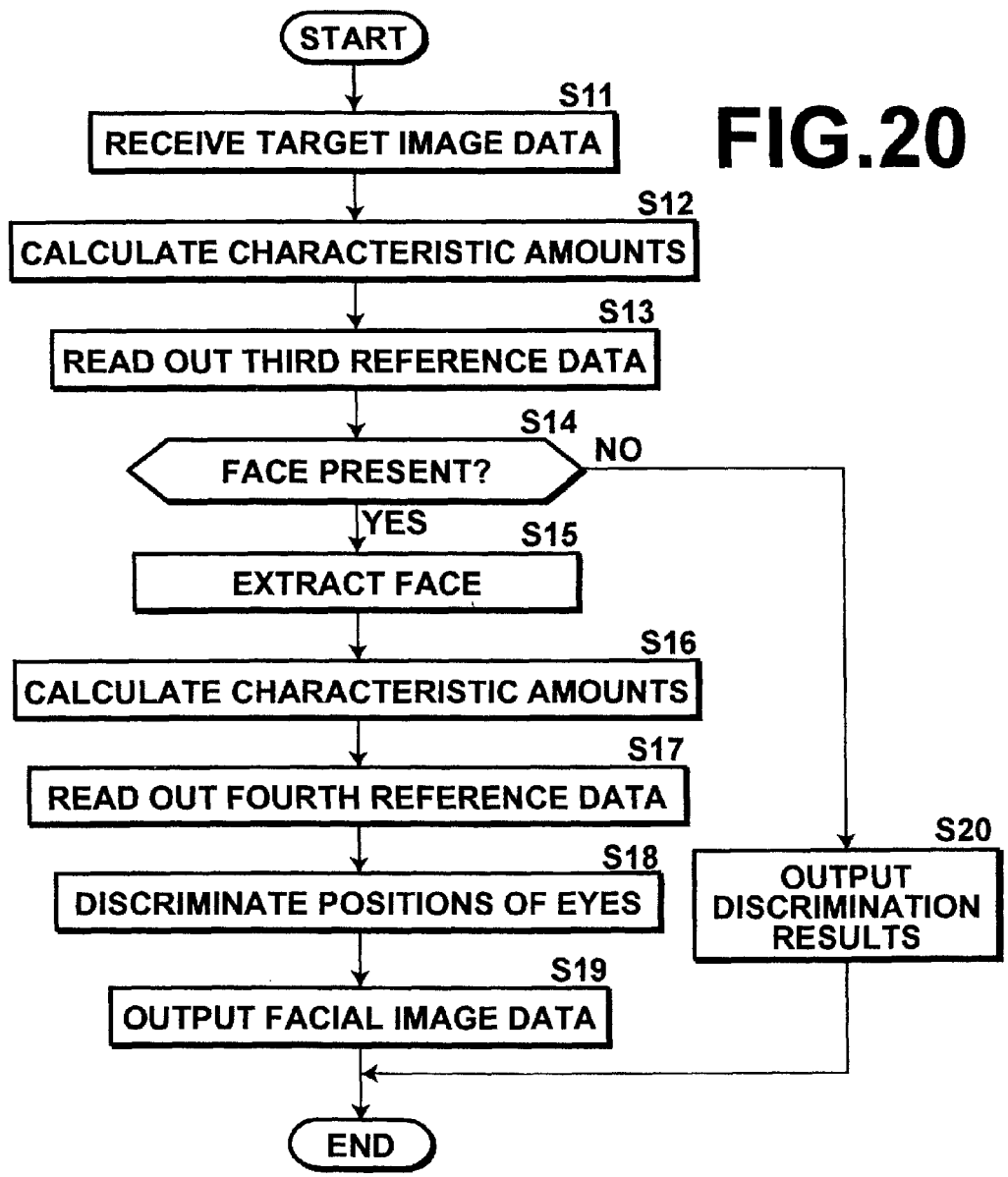
FIG. 20 is a flow chart that illustrates the processes performed by the fourth embodiment.

Next, the processes performed by the subject discriminating apparatus 101 of the fourth embodiment will be described. FIG. 20 is a flow chart that illustrates the processes performed by the fourth embodiment. First, the image input portion 102 receives input of target image data S0 (step S41). At this time, a series of target image data S0 representing a plurality of images may be received continuously. Next, the characteristic amount calculating means 104 calculates the directions and magnitudes of the gradient vectors K of the target image S0, as the first characteristic amounts C0, at each step in the stepwise enlargement/reduction and rotation thereof (step S42). Then, the first discriminating portion 108 reads the third reference data R3 out from the memory 106 (step S43), and performs the first discrimination regarding whether the target image S0 includes a face (step S44).

If the discrimination result at step S44 is positive, the first discriminating portion 108 extracts the face from the target image S0 (step S45). Note that a plurality of faces may be extracted. Next, the characteristic amount calculating means 104 calculates the characteristic amounts C0 from the candidate, at each step in the stepwise enlargement/reduction and rotation thereof (step S46). Thereafter, the second discriminating portion 110 reads the fourth reference data R4 out from the memory 106 (step S47), and performs the second discrimination regarding the positions of the eyes in the face (step S48).

Thereafter, the output portion 112 extracts a region having a predetermined range, using the discriminated positions of the eyes as a reference, outputs face image data S1, which represents the facial image of the extracted region (step S49), and the processes are completed.

If the discrimination result at step S44 is negative, it is judged that the target image S0 does not include a face, the output portion 112 outputs discrimination results indicating that a face is not included in the target image S0 (step S50), and the processes are completed.

In the fourth embodiment, it is possible to perform the second discrimination to discriminate the positions of the eyes, without performing the first discrimination. However, the learning of the fourth reference data R4 employs sample images, in which the distances between the centers of the eyes are normalized within a small allowable range. Therefore, although the positions of the eyes can be accurately discriminated, it becomes necessary to deform the entire target image S0 in a stepwise manner corresponding to the small allowable range, while referring to the fourth reference data R4 and performing the second discrimination. On the other hand, learning of the third reference data R3 employs sample images, in which the distances between the centers of the eyes are normalized within an allowable range larger than that of the sample images employed to learn the fourth reference data R4. Therefore, the amount of deformation at each step during the stepwise deformation of the target image can be comparatively larger than the case in which the fourth reference data R4 is referred to. As a result, the amount of calculations required for discrimination is reduced, and processes can be performed at high speed. However, the discrimination accuracy in discriminating the positions of the eyes is low.

In the fourth embodiment, the first discrimination discriminates the faces, and the second discrimination is performed only on the face images. Therefore, the amount of calculations is decreased compared to a case in which the second discrimination is performed on the entire target image S0. As a result, the time required for the discrimination process is shortened. Accordingly, in the fourth embodiment, the discrimination of the positions of eyes within faces, which are included in target images, can be performed at high speed and with high accuracy.

Figure 21:
FIG. 21 is a diagram that illustrates an image of a face, in which eyes are hidden by bangs.

Here, the sample images known to include the predetermined subject, which are employed during learning to obtain the third and fourth reference data R3 and R4, have the positions and/or positional relationships of the eyes therein normalized. Therefore, in the case that it is discriminated that the target image S0 includes a face, the positions of the eyes are the same as that of the eyes of the sample images. In addition, even if the eyes of the face are obscured by bangs, are closed, or otherwise unclear in the target image S0 as illustrated in FIG. 21, as long as the characteristic amounts that represent the characteristics of the face are included in the target image S0, it is possible to discriminate whether the face is included in the target image, and further, to discriminate the positions of the eyes. Accordingly, it is possible to accurately discriminate the positions of the eyes, even if the eyes are unclear within the target image S0.

Note that the characteristic amounts C0 may be calculated for regions of the target image S0 that correspond to the first region A1, the second region A2, and the third region A3 of the sample images. Thereby, the range for which the characteristic amounts C0 are calculated is decreased, in comparison to a case in which the characteristic amounts C0 are calculated for the entire target image S0. Accordingly, the time required for calculations can be further shortened.

Note that in the fourth embodiment described above, the third reference data R3 and the fourth reference data R4 are stored in the memory 106, within the subject discriminating apparatus 101. However, as long as the characteristic amount calculating portion 104, the first discriminating portion 108 and the second discriminating portion 110 are enabled to access the third reference data R3 and the fourth reference data R4, the reference data may be recorded in an apparatus separate from the subject discriminating apparatus 101, or in removable media, such as CD-ROM's.

In the fourth embodiment described above, the directions and magnitudes of the gradient vectors K are employed as the characteristic amounts C0. Alternatively, color data, such as hue and chroma, of the target image S0 may be employed as the characteristic amounts C0.

Faces are the predetermined subjects in the fourth embodiment, and discrimination is performed regarding whether faces are included in the target images S0, and regarding the positions of eyes. However, subjects having substantially uniform shapes, and which are capable of being resized to approximate a substantially uniform size during the learning process, such as vehicles and road signs, may alternatively be the predetermined subject. In this case, a structural component of the predetermined subject may be headlights of vehicles, specific marks included in road signs, and the like.

In the fourth embodiment, the second discrimination is performed on the entire facial image extracted by the first discrimination. Alternatively, the second discrimination may be performed only on regions in the vicinity of the eyes within the extracted facial image.

In the fourth embodiment, the output portion 112 extracts the face from the target image S0. Alternatively, data that represents the discriminated positions of the eyes (that is, the coordinates (x1, y1), (x2, y2)) may be attached to the target image data S0, and output therewith. The data may be written into the header or the tag of the target image data S0, to attach it to the target image data S0. Alternatively, a file having the same file name as the target image data S0 with a different file extension, such as a text file, may be inseparably integrated with the target image data S0. Note that in the case that it is discriminated that the target image S0 does not include a face, discrimination data representing this discrimination result may be attached to the target image data S0 and output therewith.

In the fourth embodiment, the positions of the eyes are discriminated from the discriminated face. Alternatively, positions of other structural components of the face, such as the corners of the eyes, the center of the mouth, the corner of the mouth, the tip of the nose, or characteristic points within the contour of the face (such as the tip of the chin) may be discriminated. In this case, sample images, in which the positions and/or the positional relationships of the structural components are normalized, are employed during learning of the third and fourth reference data R3 and R4. Note that the fourth reference data R4 is obtained by employing sample images, in which the positions and/or the positional relationships of the structural components are normalized with a smaller allowable range than that in the case of learning the third reference data R3.

A subject discriminating apparatus according to the fourth embodiment of the present invention has been described above. Programs that cause a computer to execute the functions performed by the image input portion 102, the characteristic amount calculating portion 104, the memory 106, the first discriminating portion 108, the second discrimination portion 110, and the output portion 112, are also within the scope of the present invention. In addition, computer readable media having these programs recorded therein are also within the scope of the present invention. In these cases as well, the reference data may be included within the programs or the recording media, or alternatively, be recorded in separate apparatuses or separate media.

In the first through fourth embodiments of the present invention described above, the subject discriminating apparatuses of the present invention are employed as stand alone units. Alternatively, the subject discriminating apparatuses of the present invention may be provided within a photography apparatus that obtains image data by photography, such as digital cameras, cellular telephones with built in cameras, and the like. Thereby, faces and the positions of the eyes may be discriminated during processes performed by the photography apparatus, such as face detection, red eye correction, and detecting whether eyes are open or closed.

What is claimed is:
1. A subject discriminating apparatus comprising:
an image input means for receiving a target image, which is a target of discrimination;
a characteristic amount calculating means for calculating at least one characteristic amount, which is employed in discriminating a predetermined subject that includes at least one structural component, from the target image;
a first discriminating means for discriminating whether the predetermined subject is included in the target image, by referring to first reference data in which the at least one characteristic amount and discrimination conditions corresponding to the at least one characteristic amount are defined in advance, with the at least one characteristic amount calculated from the target image while the target image is deformed in a stepwise manner within a variance corresponding to a first predetermined allowable range, wherein the first reference data is obtained by learning the at least one characteristic amount within a plurality of sample images, in which at least one of the positions and the positional relationships of the at least one structural component are normalized within the first predetermined allowable range, and a plurality of sample image groups, which are known to not include the predetermined subject, with a machine learning technique; and a second discriminating means for discriminating the positions of the at least one structural component included in the target image, by referring to second reference data in which the at least one characteristic amount and discrimination conditions corresponding to the at least one characteristic amount are defined in advance, with the at least one characteristic amount calculated from the target image while the target image is deformed in a stepwise manner within a variance corresponding to a second predetermined allowable range which is smaller than the first allowable range in the case that the first discriminating means judges that the predetermined subject is included in the target image, wherein the second reference data is obtained by learning the at least one characteristic amount within a plurality of sample images, in which at least one of the positions and the positional relationships of the at least one structural component are normalized within the second predetermined allowable range, and a plurality of sample image groups, which are known to not include the predetermined subject, with a machine learning technique.

2. A subject discriminating apparatus as defined in claim 1, wherein:

in the case that the predetermined subject is a face, the first discriminating means obtains the first reference data, by learning the at least one characteristic amount within a first region that includes a left eye and left cheek, and within a second region that includes a right eye and right cheek, of the sample images which are known to include the predetermined subject, and by learning the at least one characteristic amount within regions corresponding to the first and second regions, of the sample images which are known to not include the predetermined subject; and the first characteristic amount calculating means calculates the first characteristic amounts of regions that correspond to the first and second regions within the target image.

3. A subject discriminating apparatus as defined in claim 2, wherein:

the first discriminating means obtains the first reference data, by learning the at least one characteristic amount within a third region that includes both eyes, of the sample images which are known to include the predetermined subject, and by learning the at least one characteristic amount within regions corresponding to the third region, of the sample images which are known to not include the predetermined subject; and the first characteristic amount calculating means calculates the at least one characteristic amount of regions that correspond to the first, second, and third regions within the target image.

4. A subject discriminating apparatus as defined in claim 1, wherein:

in the case that the predetermined subject is a face, the second discriminating means obtains the second reference data, by learning the at least one characteristic amount within a first region that includes a left eye and left cheek, and within a second region that includes a right eye and right cheek, of the sample images which are known to include the predetermined subject, and by learning the at least one characteristic amount within regions corresponding to the first and second regions, of the sample images which are known to not include the predetermined subject; and the second characteristic amount calculating means calculates the at least one characteristic amount of regions that correspond to the first and second regions within the target image.

5. A subject discriminating apparatus as defined in claim 4, wherein:

the second discriminating means obtains the second reference data, by learning the at least one characteristic amounts within a third region that includes both eyes, of the sample images which are known to include the predetermined subject, and by learning the at least one characteristic amounts within regions corresponding to the third region, of the sample images which are known to not include the predetermined subject; and the second characteristic amount calculating means calculates the at least one characteristic amount of regions that correspond to the first, second, and third regions within the target image.

6. A subject discriminating apparatus as defined in claim 1, wherein:

the at least one characteristic amount is at least one of the direction of a gradient vector, the magnitude of the gradient vector, and color data, of each pixel of the target image.

7. A subject discriminating apparatus as defined in claim 1, further comprising:

an extracting means for extracting the predetermined subject from the target image, employing the positions of the discriminated structural components as a reference.

8. A subject discriminating apparatus as defined in claim 1, further comprising:

an output means for attaching data that represents the positions of the structural components within the target image, and outputting the data with the target image.

9. A photography apparatus equipped with the subject discriminating apparatus as defined in claim 1.

10. A subject discriminating method, comprising the steps of:

receiving a target image, which is a target of discrimination;

calculating at least one characteristic amount, which is employed in discriminating a predetermined subject that includes at least one structural component, from the target image;

discriminating whether the predetermined subject is included in the target image, by referring to first reference data in which the at least one characteristic amount and discrimination conditions corresponding to the at least one characteristic amount are defined in advance, with the at least one characteristic amount calculated from the target image while the target image is deformed in a stepwise manner within a variance corresponding to a first predetermined allowable range, wherein the first reference data is obtained by learning the at least one characteristic amount within a plurality of sample images, in which at least one of the positions and the positional relationships of the at least one structural component are normalized within the first predetermined allowable range, and a plurality of sample image groups, which are known to not include the predetermined subject, with a machine learning technique; and discriminating the positions of the at least one structural component included in the target image, by referring to second reference data in which the at least one characteristic amount and discrimination conditions corresponding to the at least one characteristic amount are defined in advance, with the at least one characteristic amount calculated from the target image while the target image is deformed in a stepwise manner within a variance corresponding to a second predetermined allowable range which is smaller than the first allowable range in the case that the first discriminating means judges that the predetermined subject is included in the target image, wherein the second reference data is obtained by learning the at least one characteristic amount within a plurality of sample images, in which at least one of the positions and the positional relationships of the at least one structural component are normalized within the second predetermined allowable range, and a plurality of sample image groups, which are known to not include the predetermined subject, with a machine learning technique.

11. A non-transitory computer-readable medium storing a program that when executed by a computer processor causes a computer to execute a subject discriminating method, comprising the procedures of:
  receiving a target image, which is a target of discrimination;
  calculating at least one characteristic amount, which is employed in discriminating a predetermined subject that includes at least one structural component, from the target image;
  discriminating whether the predetermined subject is included in the target image, by referring to first reference data in which the at least one characteristic amount and discrimination conditions corresponding to the at least one characteristic amount are defined in advance, with the at least one characteristic amount calculated from the target image while the target image is deformed in a stepwise manner within a variance corresponding to a first predetermined allowable range, wherein the first reference data is obtained by learning the at least one characteristic amount within a plurality of sample images, in which at least one of the positions and the positional relationships of the at least one structural component are normalized within the first predetermined allowable range, and a plurality of sample image groups, which are known to not include the predetermined subject, with a machine learning technique; and
  discriminating the positions of the at least one structural component included in the target image, by referring to second reference data in which the at least one characteristic amount and discrimination conditions corresponding to the at least one characteristic amount are defined in advance, with the at least one characteristic amount calculated from the target image while the target image is deformed in a stepwise manner within a variance corresponding to a second predetermined allowable range which is smaller than the first allowable range in the case that the first discriminating means judges that the predetermined subject is included in the target image, wherein the second reference data is obtained by learning the at least one characteristic amount within a plurality of sample images, in which at least one of the positions and the positional relationships of the at least one structural component are normalized within the second predetermined allowable range, and a plurality of sample image groups, which are known to not include the predetermined subject, with a machine learning technique.

12. A subject discriminating apparatus comprising:
  an image input means for receiving input of a target image, which is a target of discrimination;
  a characteristic amount calculating means for calculating at least one characteristic amount, which is employed in discriminating a predetermined subject that includes at least one structural component, from the target image;
  a discriminating means for discriminating whether the predetermined subject is included in the target image, by referring to reference data in which the at least one characteristic amount and discrimination conditions corresponding to the at least one characteristic amount are defined in advance, with the at least one characteristic amount calculated from the target image, while the target image is deformed in a stepwise manner within a variance corresponding to a first predetermined allowable range, wherein the reference data is obtained by learning the at least one characteristic amount within a plurality of sample images, in which at least one of the positions and the positional relationships of the at least one structural component are normalized within the first predetermined allowable range, and a plurality of sample image groups, which are known to not include the predetermined subject, with a machine learning technique, and for discriminating the positions of the at least one structural component included in the predetermined subject in the case that the predetermined subject is included in the target image.

13. A subject discriminating apparatus as defined in claim 12, wherein:
  in the case that the predetermined subject is a face and the structural components are eyes, the discriminating means obtains the reference data by learning the at least one characteristic amount within a first region that includes a left eye and left cheek, and within a second region that includes a right eye and right cheek, of the sample images which are known to include the predetermined subject, and by learning the at least one characteristic amount within regions corresponding to the first and second regions, of the sample images which are known to not include the predetermined subject; and
  the characteristic amount calculating means calculates the at least one characteristic amount of regions that correspond to the first and second regions within the target image.

14. A subject discriminating apparatus as defined in claim 13, wherein:
  the discriminating means obtains the reference data, by learning the at least one characteristic amount within a third region that includes both eyes, of the sample images which are known to include the predetermined subject, and by learning the at least one characteristic amount within regions corresponding to the third region, of the sample images which are known to not include the predetermined subject; and
  the characteristic amount calculating means calculates the at least one characteristic amount of regions that correspond to the first, second, and third regions within the target image.

15. A subject discriminating apparatus as defined in claim 12, wherein:
  the at least one characteristic amount is at least one of the direction of a gradient vector, the magnitude of the gradient vector, and color data, of each pixel of the target image.

16. A subject discriminating apparatus as defined in claim 12, further comprising:

an extracting means for extracting the predetermined subject from the target image, employing the positions of the discriminated structural components as a reference.

17. A subject discriminating apparatus as defined in claim 12, further comprising:

an output means for attaching data that represents the positions of the structural components within the target image, and outputting the data with the target image.

18. A photography apparatus equipped with the subject discriminating apparatus as defined in claim 12.

19. A subject discriminating method, comprising the steps of:

receiving input of a target image, which is a target of discrimination;

calculating at least one characteristic amount, which is employed in discriminating a predetermined subject that includes at least one structural component, from the target image;

discriminating whether the predetermined subject is included in the target image, by referring to reference data in which the at least one characteristic amount and discrimination conditions corresponding to the at least one characteristic amount are defined in advance, with the at least one characteristic amount calculated from the target image, while the target image is deformed in a stepwise manner within a variance corresponding to a first predetermined allowable range, wherein the reference data is obtained by learning the at least one characteristic amount within a plurality of sample images, in which at least one of the positions and the positional relationships of the at least one structural component are normalized within the first predetermined allowable range, and a plurality of sample image groups, which are known to not include the predetermined subject, with a machine learning technique; and discriminating the positions of the at least one structural component included in the predetermined subject, in the case that the predetermined subject is included in the target image.

20. A non-transitory computer-readable medium storing a program that, when executed by a computer processor, causes a computer to execute a subject discriminating method, comprising the procedures of:

receiving input of a target image, which is a target of discrimination;

calculating at least one characteristic amount, which is employed in discriminating a predetermined subject that includes at least one structural component, from the target image;

discriminating whether the predetermined subject is included in the target image, by referring to reference data in which the at least one characteristic amount and discrimination conditions corresponding to the at least one characteristic amount are defined in advance, with the at least one characteristic amount calculated from the target image, while the target image is deformed in a stepwise manner within a variance corresponding to a first predetermined allowable range, wherein the reference data is obtained by learning the at least one characteristic amount within a plurality of sample images, in which at least one of the positions and the positional relationships of the at least one structural component are normalized within the first predetermined allowable range, and a plurality of sample image groups, which are known to not include the predetermined subject, with a machine learning technique; and discriminating the positions of the at least one structural component included in the predetermined subject, in the case that the predetermined subject is included in the target image.

* * * * *